US011561234B2

United States Patent
Barbero-Ortega et al.

(10) Patent No.: US 11,561,234 B2
(45) Date of Patent: Jan. 24, 2023

(54) DISPENSER NOZZLE RESIDUE MITIGATION

(71) Applicant: Ventana Medical Systems, Inc., Tucson, AZ (US)

(72) Inventors: Isabel Barbero-Ortega, Seattle, WA (US); Philip Roper, Tucson, AZ (US); Shane Rowland, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 483 days.

(21) Appl. No.: 16/439,521

(22) Filed: Jun. 12, 2019

(65) Prior Publication Data

US 2019/0293671 A1 Sep. 26, 2019

Related U.S. Application Data

(63) Continuation of application No. PCT/US2017/066602, filed on Dec. 15, 2017.

(60) Provisional application No. 62/435,512, filed on Dec. 16, 2016.

(51) Int. Cl.
*G01N 35/10* (2006.01)
*B01L 3/02* (2006.01)
*B01L 3/00* (2006.01)

(52) U.S. Cl.
CPC ........ *G01N 35/1002* (2013.01); *B01L 3/0293* (2013.01); *B01L 3/523* (2013.01); *G01N 35/10* (2013.01); *B01L 2400/0611* (2013.01); *B01L 2400/0616* (2013.01); *G01N 2035/102* (2013.01); *G01N 2035/1006* (2013.01)

(58) Field of Classification Search
CPC ..... G01N 2035/1006; G01N 2035/102; G01N 35/10; G01N 35/1002; B01L 2400/0616; B01L 2400/0611; B01L 3/0293; B01L 3/523
See application file for complete search history.

(56) References Cited

U.S. PATENT DOCUMENTS

| | | | | |
|---|---|---|---|---|
| 2,896,237 | A * | 7/1959 | Owens | B65D 47/127 401/262 |
| 4,624,148 | A * | 11/1986 | Averette | G01N 35/1079 73/864.21 |
| 4,774,055 | A * | 9/1988 | Wakatake | G01N 21/253 422/562 |
| 5,433,711 | A | 7/1995 | Balaban et al. | |
| 8,337,779 | B2 * | 12/2012 | Miyashita | G01N 35/1079 422/512 |
| 8,444,936 | B2 * | 5/2013 | Taniguchi | G01N 35/1004 422/519 |
| 9,228,946 | B2 * | 1/2016 | Tokunaga | G01N 21/59 |
| 2001/0007171 | A1 * | 7/2001 | Kinoshita | B41J 2/1634 29/729 |
| 2009/0044607 | A1 * | 2/2009 | Hochgraeber | G01N 30/24 73/61.55 |
| 2010/0150782 | A1 * | 6/2010 | Fukushima | G01N 35/1016 422/82.05 |
| 2011/0300035 | A1 * | 12/2011 | Taniguchi | G01N 35/1004 422/509 |

(Continued)

*Primary Examiner* — Shogo Sasaki
(74) *Attorney, Agent, or Firm* — Charney IP Law LLC; Thomas M. Finetti

(57) ABSTRACT

The present disclosure is directed to methods and devices for reducing or otherwise mitigating accumulated reagent material and/or fluids within a dispense nozzle of a dispenser.

10 Claims, 24 Drawing Sheets

(56) References Cited

U.S. PATENT DOCUMENTS

2012/0308445 A1    12/2012  Roper et al.

* cited by examiner

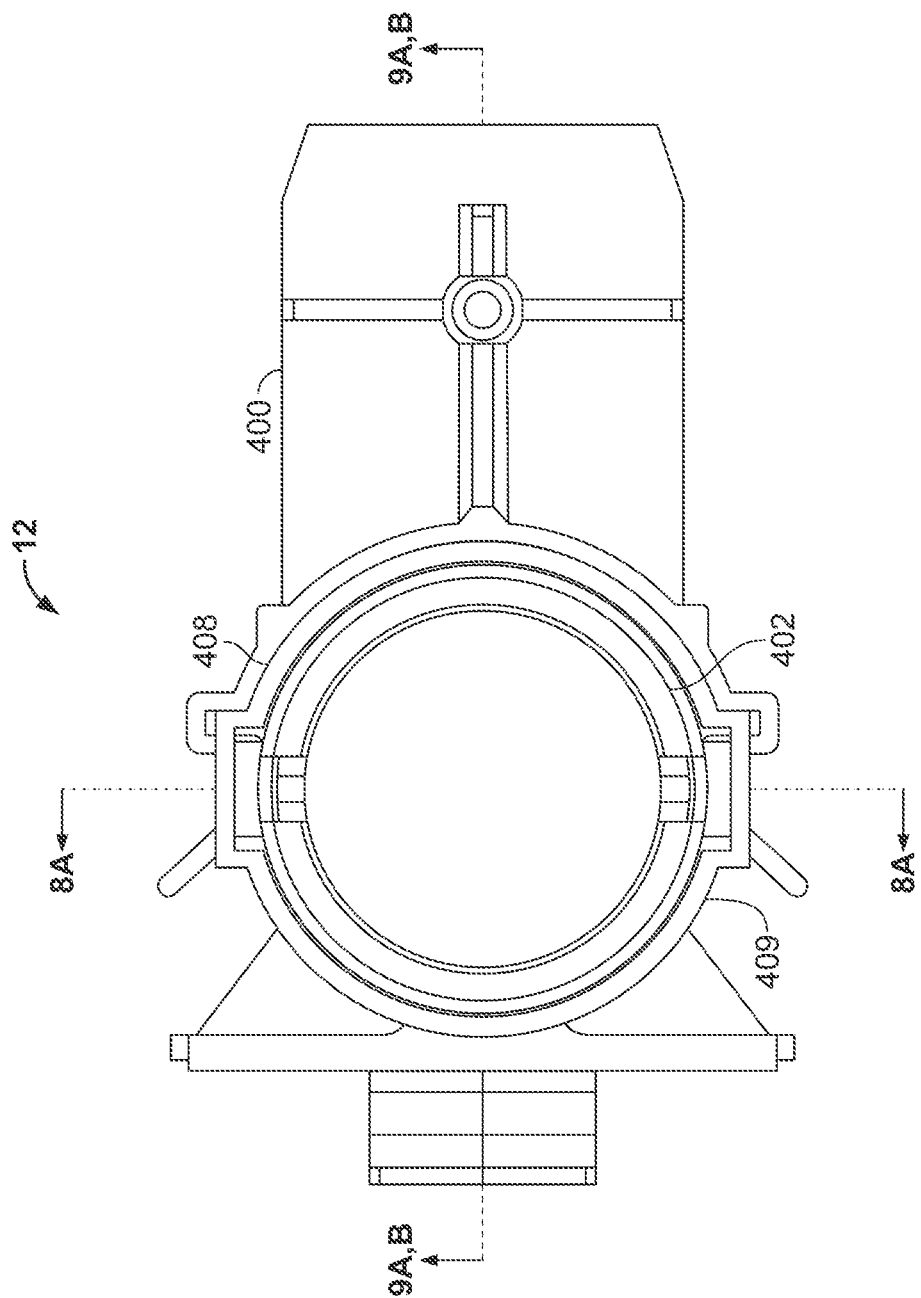

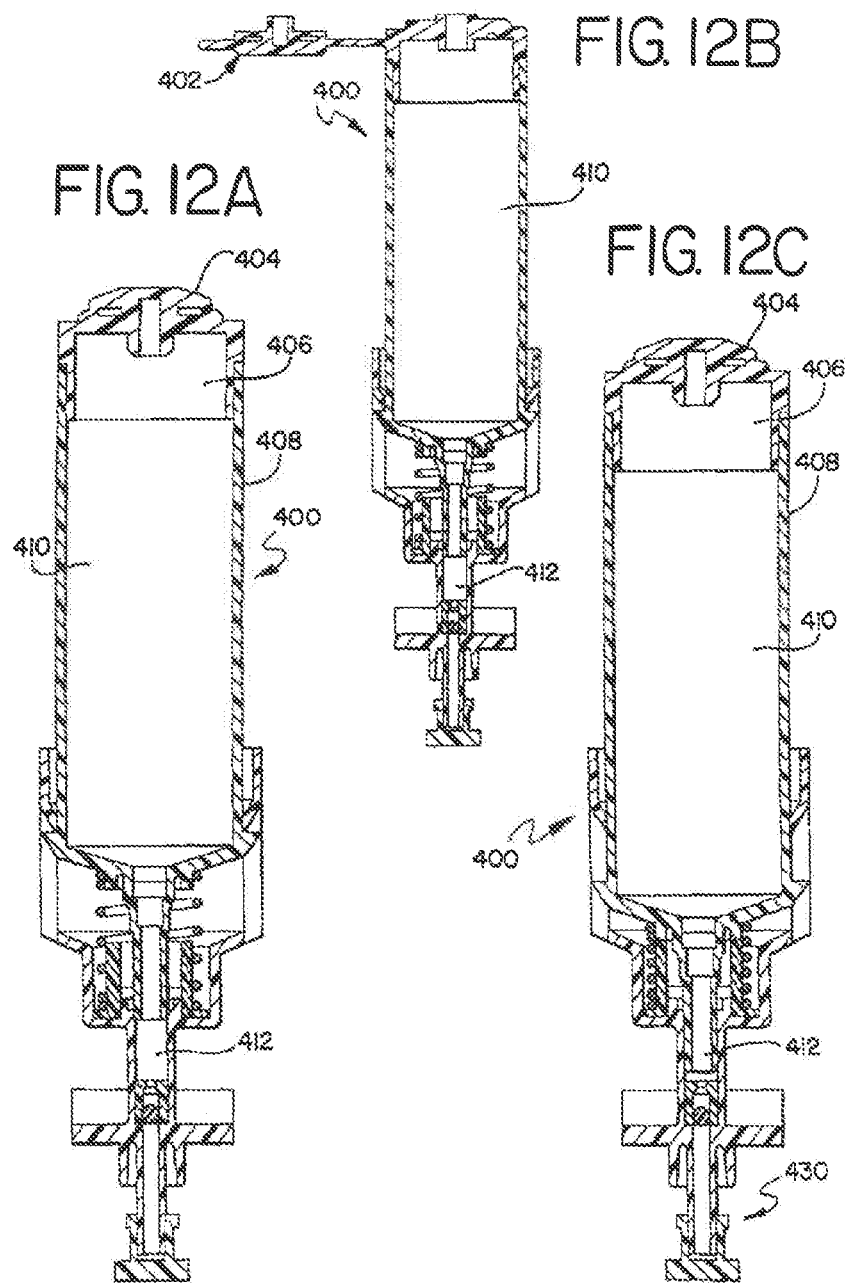

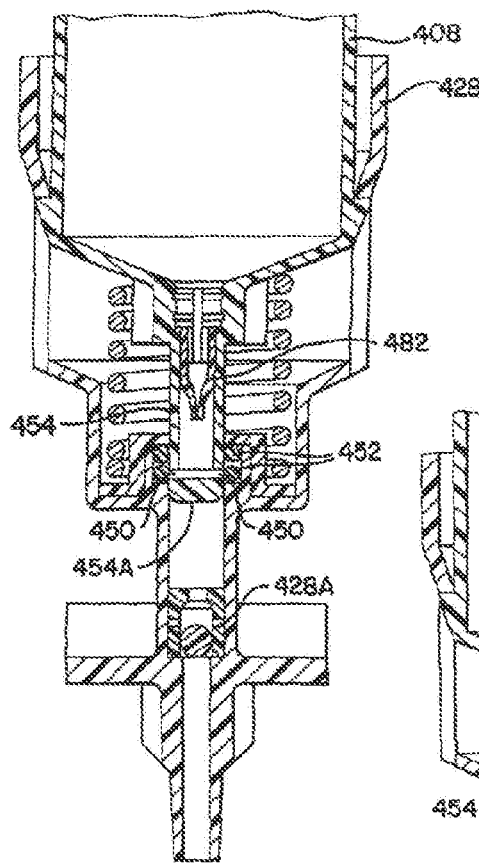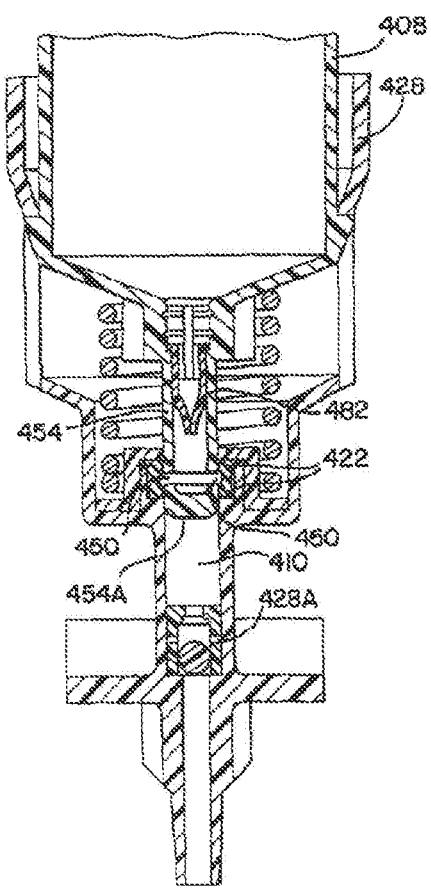

DISPENSER NOZZLE RESIDUE MITIGATION

CROSS REFERENCE TO RELATED APPLICATIONS

The present application is a continuation of International Application No. PCT/US2017/066602 filed on Dec. 15, 2017, which application claims the benefit of the filing date of U.S. Provisional Patent Application No. 62/435,512 filed Dec. 16, 2016, the disclosures of which are hereby incorporated by reference herein in their entireties.

FIELD OF THE INVENTION

Disclosed embodiments concern systems for processing specimen bearing substrates.

STATEMENT OF INDUSTRIAL APPLICABILITY

The present disclosure has industrial applicability in the field of diagnostics.

BACKGROUND OF THE DISCLOSURE

Immunostaining and in situ DNA analysis are useful tools in histological diagnosis and the study of tissue morphology. Immunostaining relies on the specific binding affinity of antibodies with epitopes in tissue samples, and the increasing availability of antibodies which bind specifically with unique epitopes present only in certain types of diseased cellular tissue. Immunostaining requires a series of treatment steps conducted on a tissue section mounted on a glass slide to highlight by selective staining certain morphological indicators of disease states. Typical steps include pretreatment of the tissue section to reduce non-specific binding, antibody treatment and incubation, enzyme labeled secondary antibody treatment and incubation, substrate reaction with the enzyme to produce a fluorophore or chromophore highlighting areas of the tissue section having epitopes binding with the antibody, counterstaining, and the like. Each of these steps is separated by multiple rinse steps to remove unreacted residual reagent from the prior step. Incubations are conducted at elevated temperatures, usually around 40° C., and the tissue must be continuously protected from dehydration. In situ DNA analysis relies upon the specific binding affinity of probes with unique nucleotide sequences in cell or tissue samples and similarly involves a series of process steps, with a variety of reagents and process temperature requirements.

Automated biological reaction systems include the biological reaction apparatus and the dispensers for the reagents and other fluids used in the biological reaction apparatus. As disclosed in U.S. Pat. No. 5,595,707, inventors Copeland et al., entitled Automated Biological Reaction Apparatus, assigned to Ventana Medical Systems, Inc. which is incorporated herein by reference, the biological reaction apparatus may be computer controlled. However, the computer control is limited in that it is dedicated to and resident on the biological reaction apparatus. Moreover, the memory, which is used in conjunction with the computer control, contains data relating to the reagents including serial number, product code (reagent type), package size (250 test), and the like.

One of the requirements in a biological reaction system is consistency in testing. In particular, the biological reaction system should apply a predetermined amount of fluid upon the slide in order to consistently test each slide in the automated biological reaction apparatus. Therefore, an important focus of a biological reaction system is to consistently and efficiently apply a predetermined amount of fluid on the slide.

Further, as disclosed in U.S. Pat. No. 5,232,664 entitled Liquid Dispenser by inventors Krawzak et al. and assigned to Ventana Medical Systems, Inc., which is incorporated herein by reference, reagents are dispensed on the slide in precise amounts using a fluid dispenser. The fluid dispenser, which is used in conjunction with the biological reaction apparatus, should be easy to manufacture, reliable and compact in size.

BRIEF SUMMARY OF THE DISCLOSURE

Applicants have developed a systems and devices for reducing an amount of material accumulated at a dispenser tip.

In one aspect of the present disclosure is a fluid dispenser including: a barrel defining a fluid reservoir chamber; a dispense nozzle in communication (e.g. fluidic communication) with the fluid reservoir chamber; and a nozzle cap comprising a body having (i) an opening disposed at a first end, and (ii) a closed second end, the opening disposed at the first end and the closed second end defining a lumen, the nozzle cap further comprising a protuberance disposed within the lumen and extending from the closed second end toward the opening at the first end. In some embodiments, at least one of the lumen and the protuberance are configured to frictionally engage a surface of the dispense nozzle. In some embodiments, the nozzle cap is configured to form a fluid-tight seal with the dispense nozzle. In some embodiments, the nozzle cap is configured to form an air-tight seal with the dispense nozzle. In some embodiments, the protuberance is configured for insertion into a bore of the dispense nozzle. In some embodiments, a surface of the lumen is configured to frictionally engage at least a portion of an outer surface of the dispense nozzle. In some embodiments, the protuberance frictionally engages at least a portion of an interior surface of the dispense nozzle. In some embodiments, the lumen has a tapered shape. In some embodiments, a portion of the lumen has a tapered shape.

In some embodiments, the nozzle cap further includes a device for removing accumulated material from an interior surface of the dispense nozzle. In some embodiments, the device for removing accumulated material is a probe tool having an elongate body adapted for at least partial insertion into a bore of the dispense nozzle. In some embodiments, the elongate body comprises a first cross-sectional dimension that is less than an inner diameter of the bore of the dispense nozzle and a second cross-sectional dimension that is greater than the inner diameter of the bore of the dispense nozzle. In some embodiments, the elongate body further comprises one or more abrading means.

In another aspect of the present disclosure is a biological specimen processing apparatus including a fluid dispenser having: a barrel defining a fluid reservoir chamber; a dispense nozzle in communication with the fluid reservoir chamber; and a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle. In some embodiments, the fluid dispenser comprises a device for preventing or mitigating the accumulation or aggregation of reagent and/or fluid at the tip of the dispense nozzle. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented. In some embodiments, the biological specimen processing apparatus further comprises a drip shield located between adjacent slide supports of a slide carousel.

In another aspect of the present disclosure is a fluid dispenser including: a barrel defining a fluid reservoir chamber; a dispense nozzle in communication with the fluid reservoir chamber; and a nozzle cap comprising an outer body portion configured and dimensioned to frictionally engage an outer surface of the dispense nozzle, and an inner body portion spaced from the outer body. In some embodiments, the inner body portion includes a protuberance, the protuberance adapted to be at least partially inserted into a bore of the dispense nozzle. In some embodiments, the protuberance at least partially engages an interior surface of the dispense nozzle. In some embodiments, no protuberance is included within the inner body portion. In some embodiments, the nozzle cap forms one of a fluid-tight seal or an air-tight seal with the dispense nozzle. In some embodiments, the lumen or a surface thereof frictionally engages an outer surface of the dispense nozzle. In some embodiments, the lumen has a Luer fitting design.

In another aspect of the present disclosure is a fluid dispenser including: a barrel defining a fluid reservoir chamber; a dispense nozzle in communication with the fluid reservoir chamber; and a nozzle cap comprising an outer body portion configured and dimensioned to frictionally engage an outer surface of the dispense nozzle, and an inner body portion spaced from the outer body, the inner body portion including, in some embodiments, a protuberance, the protuberance adapted to be at least partially inserted into a bore of the dispense nozzle. In some embodiments, the protuberance at least partially engages an interior surface of the dispense nozzle. In some embodiments, the nozzle cap forms one of a fluid-tight seal or an air-tight seal with the dispense nozzle. In some embodiments, the lumen or a surface thereof frictionally engages an outer surface of the dispense nozzle. In some embodiments, the lumen has a Luer fitting design.

In some embodiments, the nozzle cap further includes a device for removing accumulated material from an interior surface of the dispense nozzle. In some embodiments, the device for removing accumulated material is a probe tool having an elongate body adapted for at least partial insertion into a bore of the dispense nozzle. In some embodiments, the elongate body comprises a first cross-sectional dimension that is less than an inner diameter of the bore of the dispense nozzle and a second cross-sectional dimension that is greater than the inner diameter of the bore of the dispense nozzle. In some embodiments, the elongate body further comprises one or more abrading means.

In another aspect of the present disclosure is a biological specimen processing apparatus including a fluid dispenser having a barrel defining a fluid reservoir chamber; a dispense nozzle in communication with the fluid reservoir chamber; and a nozzle cap comprising an outer cylindrical body portion configured and dimensioned to frictionally engage an outer surface of the dispense nozzle, and an inner body portion spaced from the outer body defining a protuberance, the protuberance adapted to be at least partially inserted into a bore of the dispense nozzle. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented. In some embodiments, the biological specimen processing apparatus further includes a drip shield located between adjacent slide supports of a slide carousel.

In another aspect of the present disclosure is a fluid dispenser including: a barrel having a reservoir chamber; a dispense nozzle in communication with the reservoir chamber; and a nozzle cap releasably engageable with the dispense nozzle, the nozzle cap comprising a base and a retention member extending away from the base, wherein the retention member has an inner surface, a first rim, and a second rim, the inner surface and the first and second rims defining a lumen that extends from the first rim to the second rim, and wherein the nozzle cap further comprises a protuberance extending into the lumen. In some embodiments, the retention member extends from the base and into a plane perpendicular to the base. In some embodiments, the inner surface of the retention member frictionally engages an exterior surface of the dispense nozzle. In some embodiments, the protuberance is adapted for at least partial insertion into a bore of the dispense nozzle. In some embodiments, the protuberance at least partially engages an interior surface of the dispense nozzle. In some embodiments, the nozzle cap forms one of a fluid-tight seal or an air-tight seal with the dispense nozzle. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented.

In some embodiments, the nozzle cap further includes a device for removing accumulated material from an interior surface of the dispense nozzle. In some embodiments, the device for removing accumulated material is a probe tool having an elongate body adapted for at least partial insertion into a bore of the dispense nozzle. In some embodiments, the elongate body has a shape which tapers from a first cross-sectional dimension to a second cross-sectional dimension, wherein the second cross-sectional dimension is greater than an inner diameter of a bore of the dispense nozzle. In some embodiments, the elongate body further comprises one or more abrading means. In some embodiments, the elongate body includes a feature for picking, scraping, collecting or otherwise abrading material accumulated on the interior surface of the bore.

In another aspect of the present disclosure is a fluid dispenser including: a barrel defining a fluid reservoir chamber; a dispense nozzle in communication with the fluid reservoir chamber; and a nozzle cap including a retention member to releasably secure the nozzle cap to a distal end of the dispense nozzle, the retention member including a Luer fitting design adapted to engage an outer surface of the dispense nozzle, the retention member further comprising a protuberance adapted to be at least partially inserted into a bore of the dispense nozzle. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented.

In another aspect of the present disclosure is a nozzle cap including a base and a probe tool adapted for insertion into a bore of a dispense nozzle, wherein at least a portion of the probe tool comprises a cross-sectional dimension that is less than an inner diameter of the bore. In some embodiments, the probe tool is integral with a first edge of the base. In some embodiments, the probe tool has a length which does not extend past a line continuous with a second edge of the base. In some embodiments, the probe tool is located within a cutaway in the base. In some embodiments, the probe tool has a length which does not extend past the bisection of a line running through a center of the probe tool and a line continuous with an edge proximate the distal end of the probe tool.

In some embodiments, the base is substantially circular. In these embodiments, the probe tool has a length which does not extend past the bisection of a line running through a center of the probe tool and an arc continuous with a circumferential edge of the substantially circular base.

In some embodiments, the probe tool includes an elongate body having a tapered shape. In some embodiments, the probe tool comprises one or more abrading means. In some embodiments, the nozzle cap further comprises a device for releasably engaging a distal end of a dispense nozzle. In some embodiments, the device for releasably engaging the distal end of the dispense nozzle comprises an inner surface, a first rim, and a second rim, the inner surface and the first and second rims defining a lumen that extends from the first rim to the second rim, and wherein the nozzle cap further comprises a protuberance extending into the lumen. In some embodiments, the device for releasably engaging the distal end of the dispense nozzle comprises an outer cylindrical body portion configured and dimensioned to frictionally engage an outer surface of the dispense nozzle, and an inner body portion spaced from the outer body defining a protuberance, the protuberance adapted to be at least partially inserted into a bore of the dispense nozzle. In some embodiments, the protuberance at least partially contacts an interior surface of the dispense nozzle.

In another aspect of the present disclosure is a nozzle cap including: a base and a retention member extending from the base; wherein the retention member has an inner surface, a first rim, and a second rim, the inner surface and first and second rims defining a lumen, the lumen extending from the first rim to the second rim, and wherein the nozzle cap further comprises a protuberance extending into the lumen; wherein the base further comprises a probe tool adapted for insertion into a bore of a dispense nozzle, wherein the probe tool comprises at least one abrading means. In some embodiments, the probe tool has a shape which tapers from a first cross-sectional dimension to a second cross-sectional dimension, wherein the second cross-sectional dimension is greater than an inner diameter of the bore of the dispense nozzle. In some embodiments, the at least one abrading means are positioned at a tip of the probe tool. In some embodiments, the probe tool comprises an elongate member, and wherein the at least one abrading means are located along the length of the elongate member. In some embodiments, a length of the probe tool extends beyond an outer edge of the base. In some embodiments, the retention member is adapted to releasably engage the dispense member.

In another aspect of the present disclosure is a nozzle cap including a base and a body, the body comprising an outer portion, and an inner portion spaced from the outer portion and defining a protuberance, the base comprising a probe tool comprising a handle, and an elongate member, the elongate member having a shape which tapers distally from a first cross-sectional dimension to a second cross-sectional dimension. In some embodiments, the outer portion is cylindrical. In some embodiments, elongate member comprises at least one abrading means. In some embodiments, the abrading means is a bark, hook, or shoulder at the tip of the elongate member. In some embodiments, the probe tool is in the same plane as the base.

In another aspect of the present disclosure is a kit including: a fluid dispenser comprising a barrel having a reservoir chamber, a valve and a piston, the reservoir chamber containing a reagent or other fluid, the valve at a lower portion of the reservoir chamber, the piston having a bottom portion and at least one side portion, the piston having at least one hole on the side portion; and a coupler, the coupler having a dispense chamber, the piston moveable inside the coupler wherein the piston is moveable from a first position to a second position, and further comprising a seal associated with the at least one piston side portion, the seal abutting the at least one hole on the side portion in the first position; and a nozzle cap as disclosed herein. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented.

In another aspect of the present disclosure is a kit including: a fluid dispenser comprising a barrel having a piston, the piston having a bottom portion and at least one side portion, the piston having at least on hole on the side portion and having no hole in the bottom portion, the piston moveable from a first position to a second position; a seal; and a coupler, the coupler having a dispense chamber, the piston moving inside the coupler, wherein the seal abuts the at least one hole in the first position and wherein the seal does not about the at least one hole in the second position, and a nozzle cap as disclosed herein. In some embodiments, the fluid dispenser comprises a member configured to prevent or mitigate the accumulation or aggregation of reagent and/or fluid at the tip of the dispense nozzle. In some embodiments, the fluid dispenser is configured or operated such that a "suck back" volume is greater than a volume of a reagent or fluid meniscus or drop formed at the tip of the dispense nozzle such that reagent and/or fluid accumulation or aggregation at the dispense nozzle tip is mitigated or prevented.

In another aspect of the present disclosure is a probe tool assembly for insertion into a bore of a dispense nozzle including a handle and an elongate member, the elongate member having a first cross-sectional dimension which is greater than an inner diameter of the bore, and wherein the elongate member has a shape which tapers distally from the first cross-sectional dimension to a second cross-sectional dimension, wherein at least the second cross-section dimension is sized to fit within the bore.

In another aspect of the present disclosure is a fluid dispenser comprising: a barrel having a reservoir chamber; a dispense nozzle in communication with the reservoir chamber; wherein the fluid dispenser comprises a device for preventing or mitigating the accumulation or aggregation of reagent and/or fluid at the tip of the dispense nozzle. In some embodiments, the fluid dispenser is configured such that an amount of reagent or fluid drawback into the dispense nozzle or reservoir chamber is greater than a volume of a droplet formed at the tip of the dispense nozzle. In some embodiments, the fluid dispenser further comprises a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle. In some embodiments, the fluid dispenser further comprises a nozzle cap, the nozzle cap comprising a base and a body, the body comprising an outer cylindrical portion, and an inner portion spaced from the outer cylindrical portion and defining a protuberance, the base comprising a probe tool comprising a handle, and an elongate member, the elongate member having a shape which tapers distally from a first cross-sectional dimension to a second cross-sectional dimension.

In another aspect of the present disclosure is a fluid dispenser comprising: a barrel having a reservoir chamber; a dispense nozzle in communication with the reservoir chamber; and a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle.

A fluid dispenser comprising: a barrel having a reservoir chamber; a dispense nozzle in communication with the reservoir chamber; and a nozzle cap comprising a body having an opening disposed at a first end and a closed second end, the opening disposed at the first end and the closed second end defining a lumen; wherein the nozzle cap does not include a protuberance.

BRIEF DESCRIPTION OF THE FIGURES

FIG. 7 is a top plan view of the dispenser of FIG. 6;

FIG. 12A is an elevational cutaway view of a prefilled fluid dispenser in the extended position;

FIG. 12B is an elevational cutaway view of a user fillable fluid dispenser in the extended position;

FIG. 12C is an elevational cutaway view of a prefilled fluid dispenser in the compressed position;

FIG. 18A is an alternative embodiment of a cutaway view of the lower portion of the fluid dispenser;

FIG. 18B is an alternative embodiment of a cutaway view of the lower portion of the fluid dispenser;

DETAILED DESCRIPTION

Figure 1:
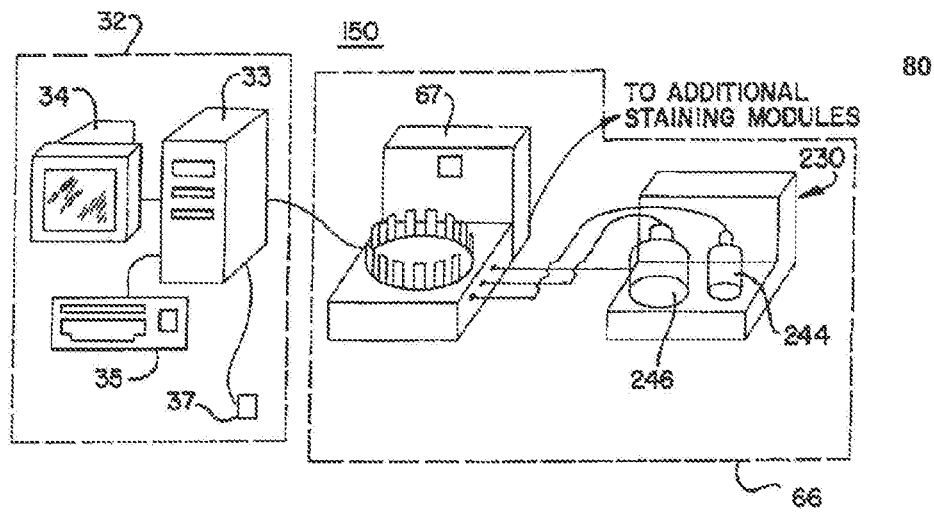
FIG. 1 illustrates an automated biological processing system.

In general, the present disclosure is directed to means for reducing or otherwise mitigating accumulated reagent material and/or fluids within a dispense nozzle of a dispenser.

As used herein, the singular terms "a," "an," and "the" include plural referents unless the context clearly indicates otherwise. Similarly, the word "or" is intended to include "and" unless the context clearly indicates otherwise.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, "biological sample," "tissue sample," or "sample" can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. The samples may be tumor samples, including those from melanoma, renal cell carcinoma, and non-small-cell lung cancers. In some embodiments, the samples are analyzed for the of presence of cancer by detecting targets, including biomarkers (e.g. proteins or nucleic acid sequences), within the tissue sample. The described embodiments of the disclosed method can also be applied to samples that do not have abnormalities, diseases, disorders, etc., referred to as "normal" samples or "control" samples. For example, it may be useful to test a subject for cancer by taking tissue samples from multiple locations, and these samples may be used as controls and compared to later samples to determine whether a particular cancer has spread beyond its primary origin.

As used herein, "immunohistochemistry" refers to a method of determining the presence or distribution of an antigen in a sample by detecting interaction of the antigen with a specific binding agent, such as an antibody. A sample is contacted with an antibody under conditions permitting antibody-antigen binding. Antibody-antigen binding can be detected by means of a detectable label conjugated to the antibody (direct detection) or by means of a detectable label conjugated to a secondary antibody, which binds specifically to the primary antibody (indirect detection).

As used herein, the term "substantially" means the qualitative condition of exhibiting total or near-total extent or degree of a characteristic or property of interest. In some embodiments, "substantially" means within about 20%. In some embodiments, "substantially" means within about 15%. In some embodiments, "substantially" means within about 10%. In some embodiments, "substantially" means within about 5%.

As used herein, "target" means any molecule for which the presence, location and/or concentration is or can be determined. Examples of targets include nucleic acid sequences and proteins, such as those disclosed herein.

Automated Specimen Processing Systems

In some embodiments, fluid dispensing and/or staining of a specimen is accomplished through the use of a specimen processing system. In some embodiments, a specimen processing apparatus is an automated apparatus, such as the BENCHMARK XT instrument, the BenchMark Special Stains instrument, the NexES Special Stainer instrument, the SYMPHONY instrument, or the BENCHMARK ULTRA instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 2003/0211630 and 2004/0052685, each of which is incorporated herein by reference in its entirety.

Examples of other commercially available specimen processing systems through which fluids, reagents, and/or staining compositions may be applied include the VENTANA SYMPHONY (individual slide stainer) and the VENTANA HE 600 (individual slide stainer) series; the Dako CoverStainer (batch stainer) from Agilent Technologies; the Leica ST4020 Small Linear Stainer (batch stainer), Leica ST5020 Multistainer (batch stainer), and the Leica ST5010 Autostainer XL series (batch stainer) H&E stainers from Leica Biosystems Nussloch GmbH.

FIG. 1 shows an automated biological processing system 80 including a host device 32 and a remote device 66. The remote device 66 includes a staining module 67 and a bulk fluid module 230. The host device 32 includes a host computer 33, a monitor 34, a keyboard 35, and a mouse 37. The host device 32 commands the staining module 67 to deliver a set of fluids from an array of dispensers to process specimens on microscope slides in the staining module 67. After processing, the slides can be removed from the staining module 67 for examination or subsequent processing. In general, the automated biological processing system automates the staining of biological samples, e.g. patient biopsy samples, on glass slides that allow pathologists, or other medical professionals, to determine if a patient has a particular disease, e.g. cancer.

Figure 2:
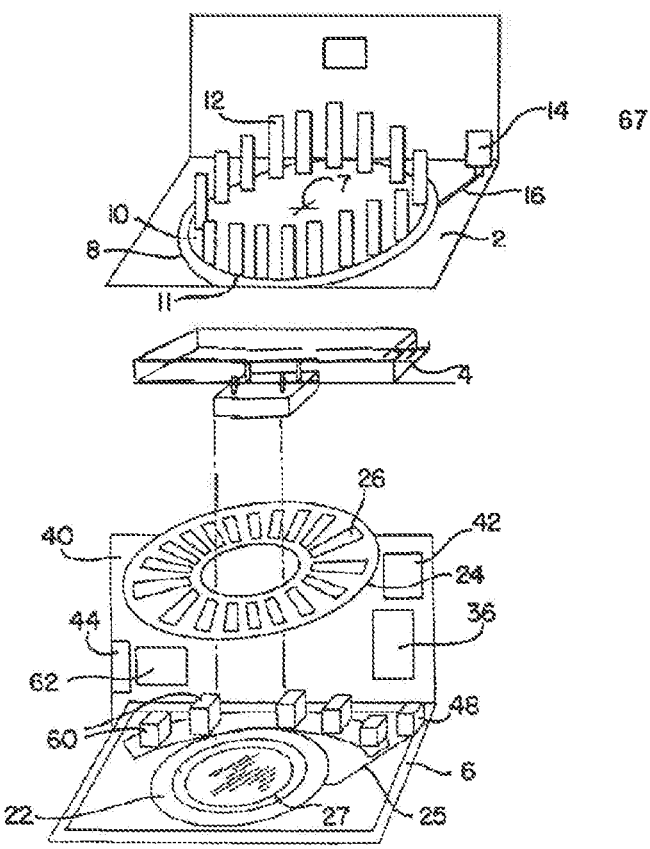
FIG. 2 provides an exploded view of the biological processing system of FIG. 1.

Referring to FIGS. 1 and 2, staining module 67 is capable of performing different protocols. The dispensers 12 can be conveniently replaced to perform different protocols or when emptied and can be stored for extended lengths of time. In some embodiments, staining module 67 may include dispensers that filter reagents to ensure proper functioning, even after the dispensers are stored for a significant length of time (see, e.g. FIG. 19).

In some embodiments, staining module 67 performs immunochemical staining protocols. Exemplary immunochemical staining protocols can include dispensing a rinsing solution (e.g., a solution comprising water and a detergent) to wash an assay region of a slide (the region containing the tissue section). An evaporation inhibitor liquid can be applied to cover the assay region. For antigens requiring unmasking, the tissue section is combined with a stabilized proteolytic enzyme solution. The slide is rinsed, and the evaporation inhibitor liquid is reapplied to the slide. A primary antibody in diluent containing globulins from the same species as a second antibody is combined with the tissue section for a time sufficient for substantially complete antibody binding. The slide is rinsed and the evaporation inhibitor liquid is reapplied. A labeled second antibody is applied to the tissue section for a time sufficient for substantially complete antibody binding. The slide is rinsed and the evaporation inhibitor liquid is reapplied to the slide. Color development reagents, including a stabilized peroxidase chromophore formulation, are combined with the tissue section for a time sufficient for color development. The stabilized peroxidase chromophore formulation comprises a peroxidase chromophore (at a concentration in the working range of the enzyme) an acidic buffer, a reducing agent, and a glycol. Chromophores can include 3,3'-diaminobenzidine and tetrahydrochloride (DAB) and 3-amino-9-ethylcarbazole (AEC). After color development, the tissue section is washed and ready for coverslipping. Each of the different liquids can be dispensed from a different dispenser.

In some embodiments, the automated specimen processing apparatus may include a carousel for holding a plurality of substrates, e.g. microscope slides, wherein each substrate includes a biological sample to be stained. The automatic staining equipment can also include a device for rotating the carousel at predetermined speeds and a mechanism for directing and controlling application of reagents, including staining compositions, onto the substrates and samples during rotation of the carousel. Once the slides are loaded into the instrument, test protocols will dictate which fluids are dispensed onto the substrates at specific times. At the appropriate time, in some embodiments, a dispenser rack will rotate to align a correct fluid over a substrate and the instrument will dispense a predetermined amount of a fluids onto the substrate. The instrument will allow the fluid to remain in contact with the biological sample for a predetermined amount of time. In some embodiments, the automated specimen processing apparatus further includes a heating or cooling device (such as a conductive heater or a Peltier device) such that at least one of the biological sample or the stains, fluids, or reagents applied to the sample are heated to a predetermined temperature and/or for a predetermined amount of time. In some embodiments, the specimen processing apparatus can be configured to provide conductive and/or radiant heating. Conductive heating can be provided via a plate with a resistive heater. One or more lamps can provide radiant heating. The apparatus can controllably increase or decrease the temperature of the specimens. Suitable examples of slide heating devices are described in U.S. Pat. Nos. 7,425,306 and 6,582,962, the disclosures of which are hereby incorporated by reference herein in their entireties.

Referring to FIG. 2, staining module 67 includes a dispenser assembly 2, an intermediate section 4, and a platform assembly 6. The dispenser assembly 2 can include a reagent tray 10 that supports dispensers in the form of fluid dispensers 12. Dispensers 12 can be supported by the reagent tray 10 and, in some embodiments, mounted in reagent fluid dispenser receptors 11 rotatable about a central axis 7 using a rotatable carousel 8.

Dispensers 12 can be capable of selectively dispensing desired volumes of fluids (e.g., gases, liquids, or gas/liquid mixtures) onto specimen-bearing slides carried on slide supports 26. The dispensed fluids can be, without limitation, reagents, probes, rinses, and/or conditioners and can include solvents (e.g., polar solvents, non-polar solvents, etc.), solutions (e.g. aqueous solutions or other types of solutions), or the like. Reagents include, without limitation, stains, wetting agents, antibodies (e.g., monoclonal antibodies, polyclonal antibodies, etc.), antigen recovery fluids (e.g., aqueous- or non-aqueous-based antigen retrieval solutions, antigen recovery buffers, etc.), or the like. Stains include, without limitation, dyes, hematoxylin stains, eosin stains, conjugates of antibodies or nucleic acids with detectable labels such as haptens, enzymes or fluorescent moieties, or other types of substances for imparting color and/or for enhancing contrast. DAB reagents can be used to provide contrast of enzyme sites (e.g., light to dark brown) and can be used to provide purple/black staining.

Once the slides are loaded into the instrument, the test protocols will dictate which reagents are dispensed onto the slides at specific times. The accuracy of the reagent dispense volume is controlled by the plastic dispenser assemblies that are loaded onto the top carrousel. At the appropriate time, the dispenser rack will rotate to align the correct reagent over a slide and a top pneumatic hammer will compress the dispenser to cause a measured dispense of reagent is put onto the slide. Heating, incubating, stirring, chemistry, and washing all contribute to certain cell markers taking on different colors that can be interpreted by the pathologist.

The receptors 11 are configured to receive and hold the dispensers 12 and can be equally spaced in a circular pattern that is axially concentric with the carousel axis 7 (see FIG. 2). The number of receptors 11 can be sufficient to accommodate the number of different reagent fluid dispensers 12 required for a cycle or series of cycles. Twenty-five fluid dispenser receptors 11 are shown, but the number can be smaller or greater, and the diameter of the reagent tray 10 can be increased to accept a larger number of reagent fluid dispensers 12. A motor 14 (e.g., a stepper motor) moves a drive belt 16 to rotate the reagent carousel 8. In some embodiments, an actuator mechanism can be an air cylinder actuator that causes dispensing of fluid from one of the dispensers.

The intermediate section 4 includes a vortex mixing plate to which four of the six mix blocks are attached. The remaining two mix blocks are mounted on the platform mechanism 6. Other types of mixing apparatuses can also be used.

The platform assembly 6 includes a support plate 22 upon which a slide carousel 24 is rotatably mounted. The slide carousel 24 carries the slide supports 26. The slide carousel 24 may comprise one or more drip shields, such as drip shields position between adjacent slide supports 26 as further disclosed herein. Heated air is supplied by a resistive heating element and a blower. The support plate 22 also supports a controller in the form of a remote device microcontroller 36, a power supply 42, and fluid and pneumatic valves 62.

Spray blocks 60 can apply liquids such as rinses, LIQUID COVERSLIP™, etc. The remote device microcontroller 36 can include one or more processors and can be replaced by a standard computer. The remote device microcontroller 36 interfaces, via an RS-485 line, with the host device 32. The platform assembly 6 includes a support plate 40 supporting accessories, such as the power supply 42 and a buffer heater 44.

The platform 6 further includes a motor 48 (e.g., a stepper motor) that moves a drive belt 25 which in turn engages a drive sprocket of the slide carousel 24. The motor 48 can controllably rotate the slide carousel 24 to position slides under dispensers. An annular waste liquid sump surrounds the shroud and is supported on the bottom of plate 22. The waste reagent and rinse fluids are collected in the sump and passed to a drain through an outlet tube in the sump bottom.

Figure 3:
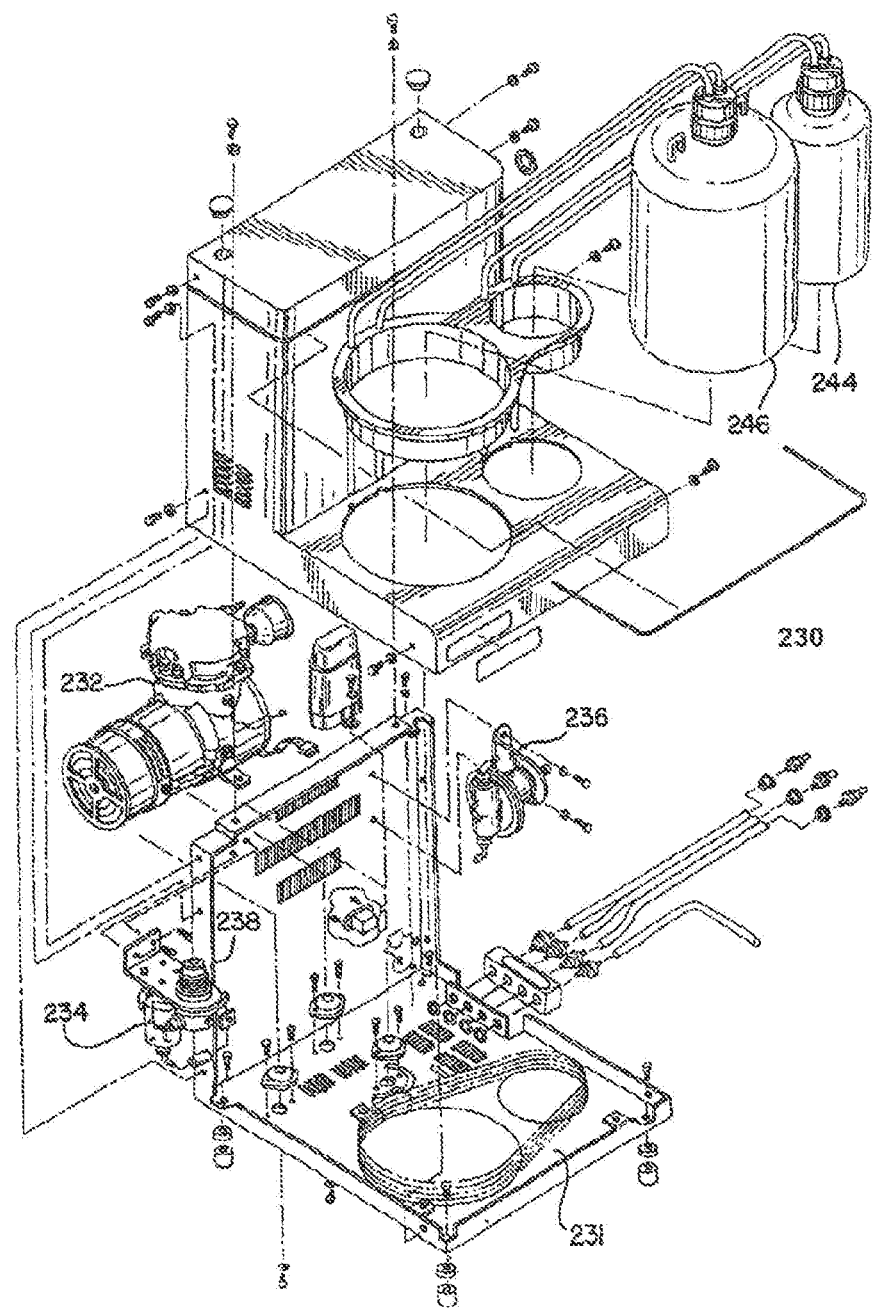
FIG. 3 is a partial exploded isometric view of a bulk fluid module according to one embodiment.

Referring to FIG. 3, bulk fluid module 230 includes an air compressor 232, a pressure relief valve 238, cooling tubing 231, a water condenser and filter 234, an air pressure regulator 236, a container 246 holding wash buffer, and a container 244 holding a coverslipping material, such as LIQUID COVERSLIP™. The air compressor 232 outputs compressed air regulated by the pressure relief valve 238 to a desired pressure (e.g., about 25 psi). The air passes from the compressor 232 through the cooling tubing 231 and enters the condenser and filter 234. From the condenser and filter 234, the air passes to the pressure regulator 236. The pressure regulator 236 regulates the pressure to a lower pressure (e.g., 13 psi). In some embodiments, the low pressure air is supplied to the wash buffer container, container and staining module. Water condensing out of the compressed air passes out of the condenser and filter through the pressure relief valve and exits the bulk module 230.

Figure 4:
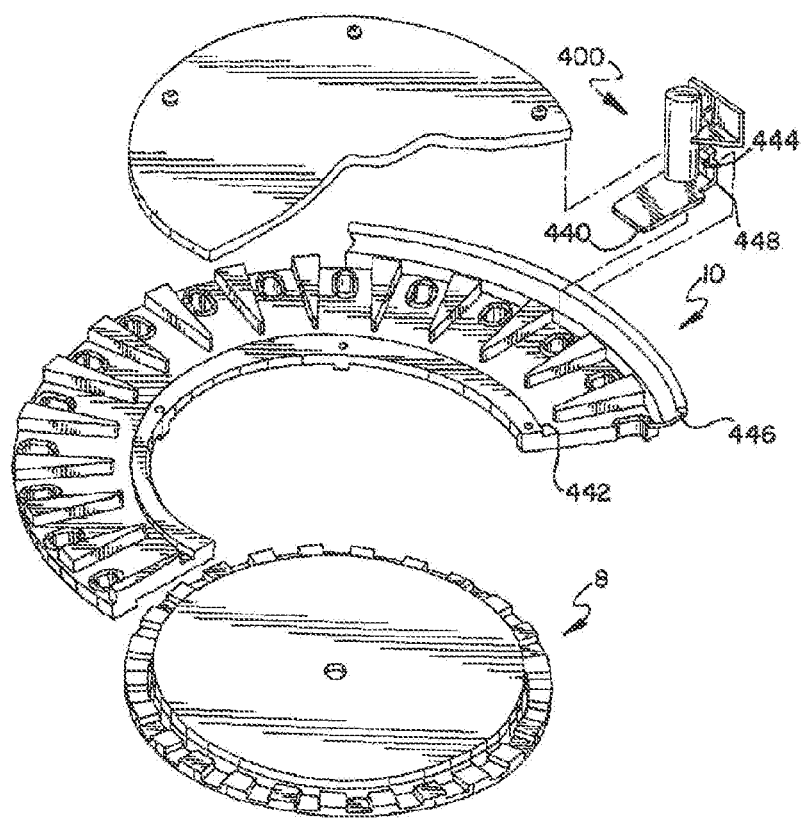
FIG. 4 is an exploded isometric view of a dispensing tray assembly.
Figure 5:
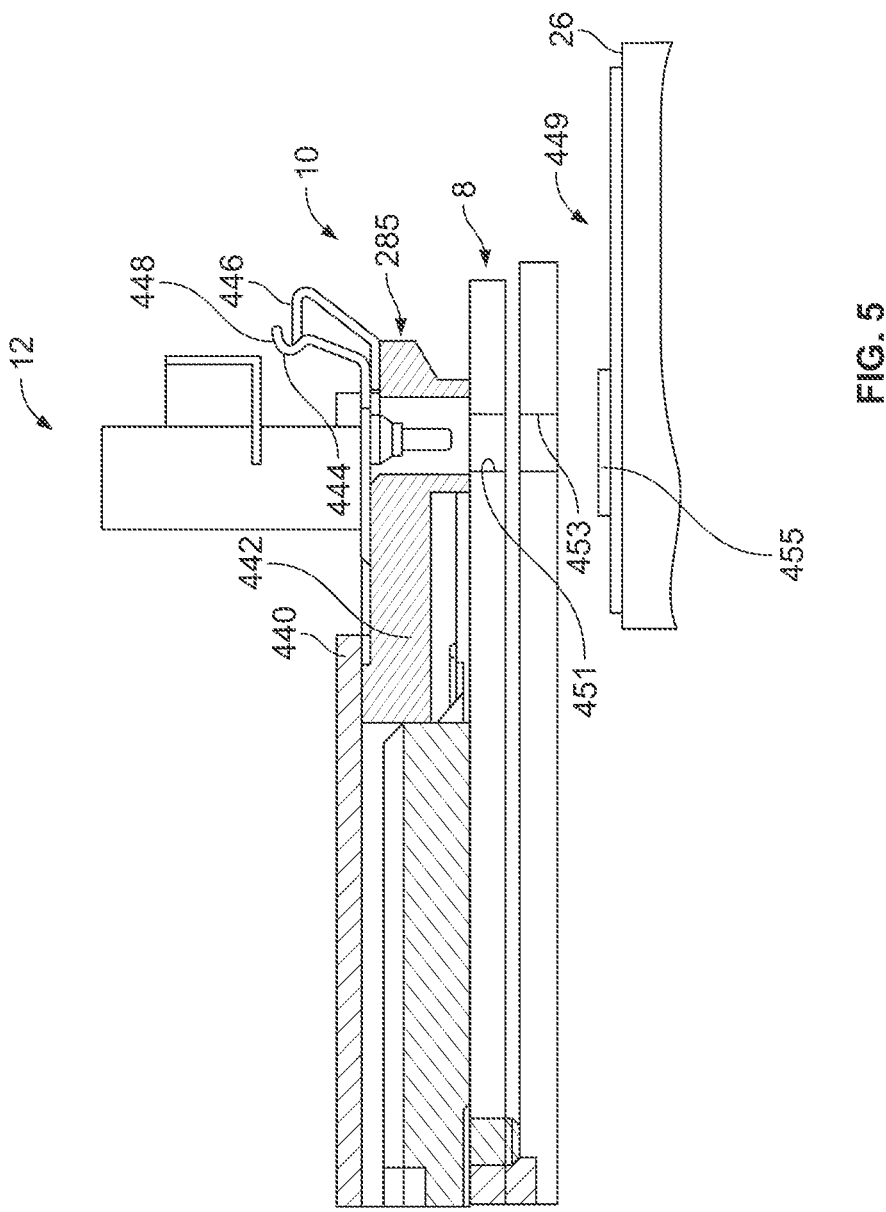
FIG. 5 is a partial cross-sectional view of a reagent tray carrying a dispenser and engaging a drive carousel.

FIGS. 4 and 5 illustrate a method of mounting a fluid dispenser 12 in a reagent tray 10. A foot 440 can be inserted into a circular U-shaped groove 442 formed in the reagent tray 10. In an alternative embodiment, the foot is inserted into a rectangular shaped groove. Groove 444 of spring member 448 engages a circumferential lip 446 of the reagent tray 10.

FIG. 5 is a cross-sectional view of the reagent tray 10 after the dispenser 12 has been mounted such that the foot 440 fits into groove 442. Fluid can fall through openings 451, 453 onto a specimen 455 on a slide 449 resting on a slide support 26. The spring member 448 flexes to hold the fluid dispenser 12 firmly in place. To remove the fluid dispenser 12, spring member 448 is simply bent inward slightly so that the groove 444 clears the lip 446, and the foot 440 is withdrawn from the groove 442. A user can conveniently remove the fluid dispenser 12 from the tray 10 to inspect, repair, refill, or replace the dispenser 12.

Fluid Dispensers and Dispense Nozzles

Figure 6:
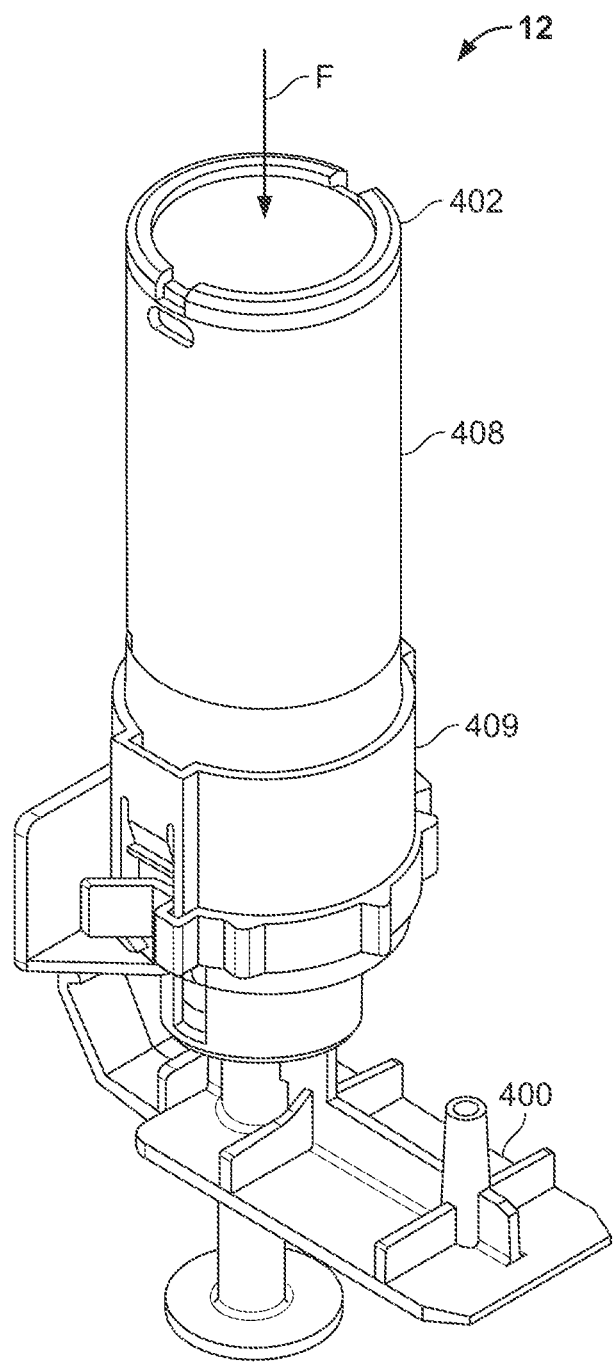
FIG. 6 is an isometric view of a dispenser according to one embodiment.

Referring to FIGS. 6 and 7, dispenser 12 includes a cap 402, a barrel 408, and a barrel holder 409. To dispense fluid, a force F (see FIG. 6) is applied to the cap 402. The barrel 408 slides into the barrel holder 409 towards a lowered or depressed position to release a predetermined volume of fluid. An actuation mechanism can return the barrel 408 to the illustrated raised or extended position. The barrel 408 can be reciprocated any number of times until it is empty. The empty dispenser 12 can be conveniently replaced with a full dispenser. In disposable embodiments, the empty dispenser 12 is discarded. In re-usable embodiments, the dispenser 12 is refilled.

Referring to FIG. 12A, there is shown an elevational cutaway view of a prefilled fluid dispenser 400 in the extended position. FIG. 12B shows an elevational cutaway view of a user fillable fluid dispenser 400 in the extended position. In some embodiments, the difference between the prefilled and customer fillable dispensers is the substitution of a flip cap 402 to replace the snap cap 404. The fluid dispenser 400 has a reservoir chamber 410, which stores the fluid, and a dispense chamber 412, whereby the reservoir chamber 410 is above the dispense chamber 412. The reservoir chamber 410 is substantially in line with the dispense chamber, and in some embodiments, coaxial with the dispense chamber 412.

The reservoir chamber 410 shape is as shown in FIGS. 12A and 12B. The reservoir shape may also be funnel-like or any other shape which drains the fluid through the connecting means between the reservoir chamber 410 and the dispense chamber 412. The connecting means between the reservoir chamber 410 to the dispense chamber 412 in some embodiments is a valve, such as a duckbill check valve which has a means to sense pressure differentials. In other embodiments, the connecting means is any device which transfers fluid in one direction (from the reservoir chamber 410 to the dispense chamber 412) and which passes fluid based on a pressure differential. This includes using an umbrella valve or the cup check valve 792 (see, e.g. FIG. 20).

In some embodiments, and as depicted in FIGS. 12A, 12B, 12C, 17, and 19, fluid is ejected from the dispense chamber 412 by exerting a downward force on the cap, against the force of the compression spring 418. This forces the barrel 408 downward until it reaches the stop 420 which prevents the barrel 408 from further downward movement, as shown in FIG. 12C. When the fluid dispenser 400 is mounted on a reagent tray 10, as illustrated in FIG. 5, the downward force on the cap 404 is applied by the dispense cylinder extend air line or by some other means to push the barrel 408 downward. The downward movement of the barrel 408, including the lower portion of the barrel which acts as a piston, expels fluid from the dispense chamber 412. In some embodiments, the downward force on the cap 404 may be altered, such that different dispense velocities may be provided. Without wishing to be bound by any particular theory, it is believed that by slowing the velocity of the dispense, a dispense diversion angle may be reduced, thereby providing a method for mitigating reagent material and/or fluid from missing the slide beneath the dispense nozzle 430 (see other methods and devices for reducing or mitigating reagent build-up herein).

Figure 13A:
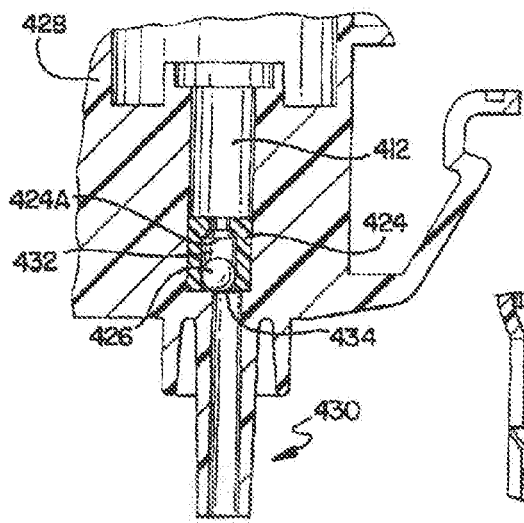
FIG. 13A is a cutaway view of the ball chamber and nozzle.

Referring to FIGS. 12A, 12B, 12C, 17 and 19, as the spring 418 expands, the barrel 408 moves upward and one or more balls 426 move upward as well. In some embodiments, the dispenser comprises only single ball. In some embodiments, the fluid dispenser comprises only a single ball. Referring to FIG. 13A, there is shown a detailed view of the ball chamber 432 and nozzle 430. In some embodiments, the dispense nozzle comprises features which serve as a means for reducing the build-up of reagent material within the bore of the dispense nozzle or enveloping its tip. The coupler 428 is formed where a hole in the coupler is offset for ball chamber 432 so that an inner edge of nozzle 430 protrudes into the outlet of ball chamber 432. Ball chamber 432 contains one or more balls 426 which fits loosely against the cylindrical surface of ball chamber 432 and is free to move between an uppermost position and a lowermost position. In its uppermost position, the one or more balls 426 mate with the ball check valve insert 424, thereby preventing fluid flow in the direction from nozzle 430 to dispense chamber 412. At its lowermost position, the one or more balls 426 are restrained by inner edge of nozzle 430 and prevented from falling into nozzle 430. This does not prevent fluid from flowing from ball chamber 432 to nozzle 430, however.

Using the above described structure as a basis, the operation and unique characteristics of fluid dispenser 400 will now be described. At the beginning of a dispense stroke, the fluid dispenser 400 is in the positions shown in FIGS. 12A and 12B. When fluid is to be dispensed, a downward force is applied against cap 402. With reference to FIGS. 13A, 13B, 13C, 17 and 19, this overcomes the force of compression spring 418 and forces the barrel 408 downward until it reaches the top of the stop 420, thereby dispensing a predetermined volume of liquid, e.g. a volume of approximately 100 μL. This is equal to the liquid volume of the area that the barrel 408 moves down minus the "suck back" (which is the amount of fluid that travels past the ball on the upstroke of the barrel 408 before the one or more balls 426 shut off the flow). The fluid flows from dispense chamber 412 into ball chamber 432. The downward flow through ball chamber 432 forces the one or more balls 426 to their lowermost position, abutting edge 434, but this does not prevent flow in this direction and the measured amount of fluid is ejected from nozzle 430.

When the barrel 408 has reached its lower extreme position, the downward force on cap 402 is released, by the microcontroller 36 actuating the valve 248B for the dispense cylinder retract air line and compression spring 418 takes over, forcing barrel 408 and cap 402 in an upward direction. Fluid begins to be sucked into dispense chamber 412, which was described previously as the "suck back."

It is here that the interplay of ball check valve insert 424 and the one or more balls 426 in the ball chamber 432 is described. The one or more balls 426 move freely within ball chamber 432, and therefore provides essentially no resistance to fluid flow from nozzle 430 until it reaches its sealing position at the ball check valve insert 424. When the dispenser operation is completed, the fluid flow has forced the one or more balls 426 to its lowermost position, abutting edge 434. As the upward movement of the barrel 408 begins to draw fluid back into dispense chamber 412, the upward flow of fluid in ball chamber 432 pulls the one or more balls 426 upward until it reaches ball check valve insert 424, where it cuts off any further fluid flow toward dispense chamber 412. Until the one or more balls 426 reaches the ball check valve insert 424, however, there is virtually no resistance to fluid flow from nozzle 430, and therefore no pressure differential is created across duck bill check valve 416 sufficient to cause fluid flow from reservoir chamber 410 to dispense chamber 412.

The volume of fluid which flows from nozzle towards dispense chamber 412 ("suck back") while the one or more balls 426 are moving from its lowermost to its uppermost position is preselected to be a volume equal to the volume of the hanging drop left at tip at the end of the dispense cycle. Thus, the drip is effectively drawn back into nozzle 430 and an internal meniscus forms at tip. In some embodiments, the "suck back" fluid volume is greater than the hanging drop volume in order to draw the fluid further back into the nozzle tip as a means of substantially preventing, reducing, or mitigating evaporation residue formation.

When the one or more balls 426 reach the ball check valve insert 424, it shuts off further flow from nozzle 430 into dispense chamber 412. This immediately creates a pressure differential across duckbill check valve 416 and causes fluid to flow from reservoir chamber 410 into dispense chamber 412. The suction generated in dispense chamber 412 keeps the one or more balls 426 firmly seated against the ball check valve insert 424 and prevents any further flow from nozzle 430. When compression spring 418 has forced barrel 408 upward, as shown in FIGS. 12A and 12B, the fluid dispenser 400 is ready for another dispense cycle. When the pressure differential is at equilibrium, the one or more balls 426, being made of a material slightly denser than the liquid, fall through ball chamber 432 until it makes contact again with edge 434.

Figure 13B:
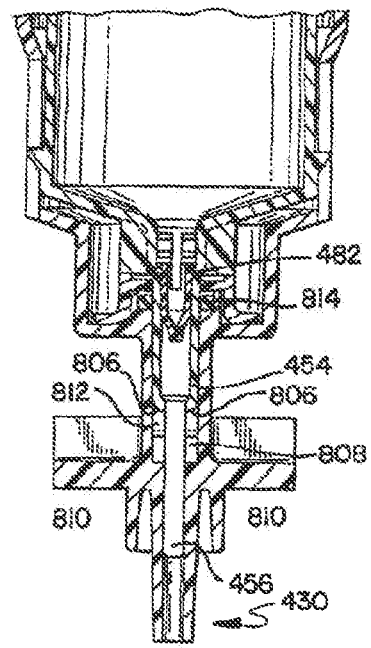
FIG. 13B illustrates a front cutaway view of the lower portion of the barrel with an extension section.
Figure 13C:
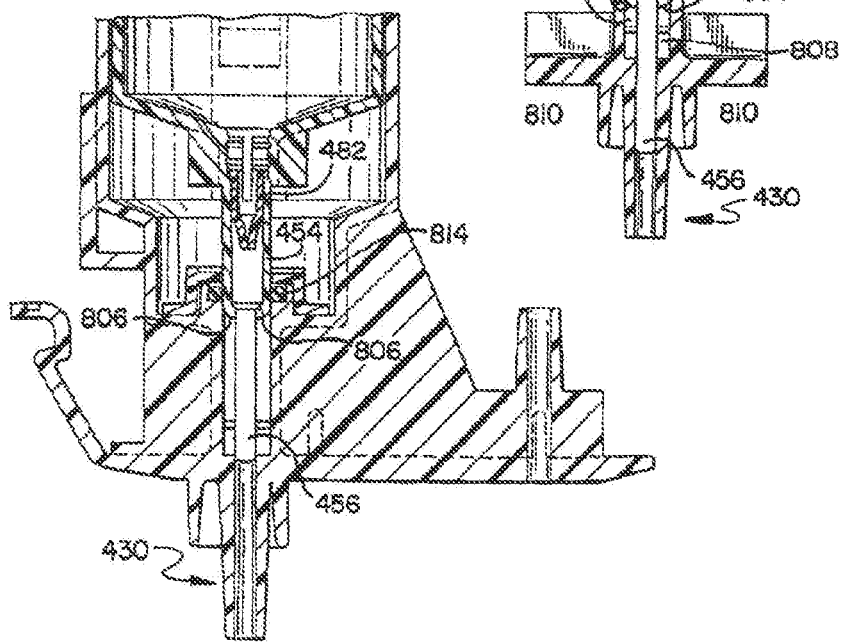
FIG. 13C illustrates a side cutaway view of the lower portion of the barrel with an extension section.

Referring to FIGS. 13B and 13C, there is shown a front and side cutaway of the lower portion of the fluid dispenser 400, respectively, in an alternative embodiment of the invention wherein the ball check valve insert 424 and the one or more balls 426 are removed. In order to retract a hanging drop from the edge of the nozzle 430, the piston 454 on the end of the barrel 408 has an extension piece 456 connected to it. In this manner, when the barrel 408 is raised upward, the extension piece 456 moves upward as well, thereby retracting any drops on the edge of the nozzle 430. In particular, FIG. 13B shows the barrel is in the down position.

There are holes 806 where the extension piece is attached to the bottom of the piston 454. In an alternate embodiment, the piston 454 has a single hole 806. When the piston rides down, the O-ring 810 is a tight fit with the extension piece so that the O-ring 810 travels with the extension piece. Because the O-ring 810 is not flush with the chamfer 808 (which is a cone shaped), fluid in the dispense chamber can flow down around the back side of the O-ring 810 and out through the nozzle 430. A second O-ring 814 takes the place of the quad seal 422.

On the upstroke, the O-ring 810 travels with the extension piece 454, which is attached to the piston 454, until the O-ring 810 seats against the chamfer 808. In this manner, the extension piece 454 acts as a piston extension. The chamfer 808 is housed inside the O-ring insert 812 and is fixed during movement of the piston. The O-ring insert 812 is connected to the coupler 428. When the O-ring 810 seats in the chamfer 808 (closing off any flow), there is a vacuum created in the dispense chamber 412, which creates the pressure differential to dispense fluid into the dispense chamber 412 through the check valve 482. Simultaneously with the upstroke, the fluid travels with the extension piece 454, and the drop at the end of the tip of the dispenser travels with the fluid due to surface tension. Therefore, the hanging drop is pulled back into the nozzle 430. Moreover, with the barrel 408 in the up position, fluid does not travel through the holes 806 due to the O-ring 810 seating inside the chamfer 808. In this embodiment, the ball and ball check valve insert is not necessary.

Figure 17:
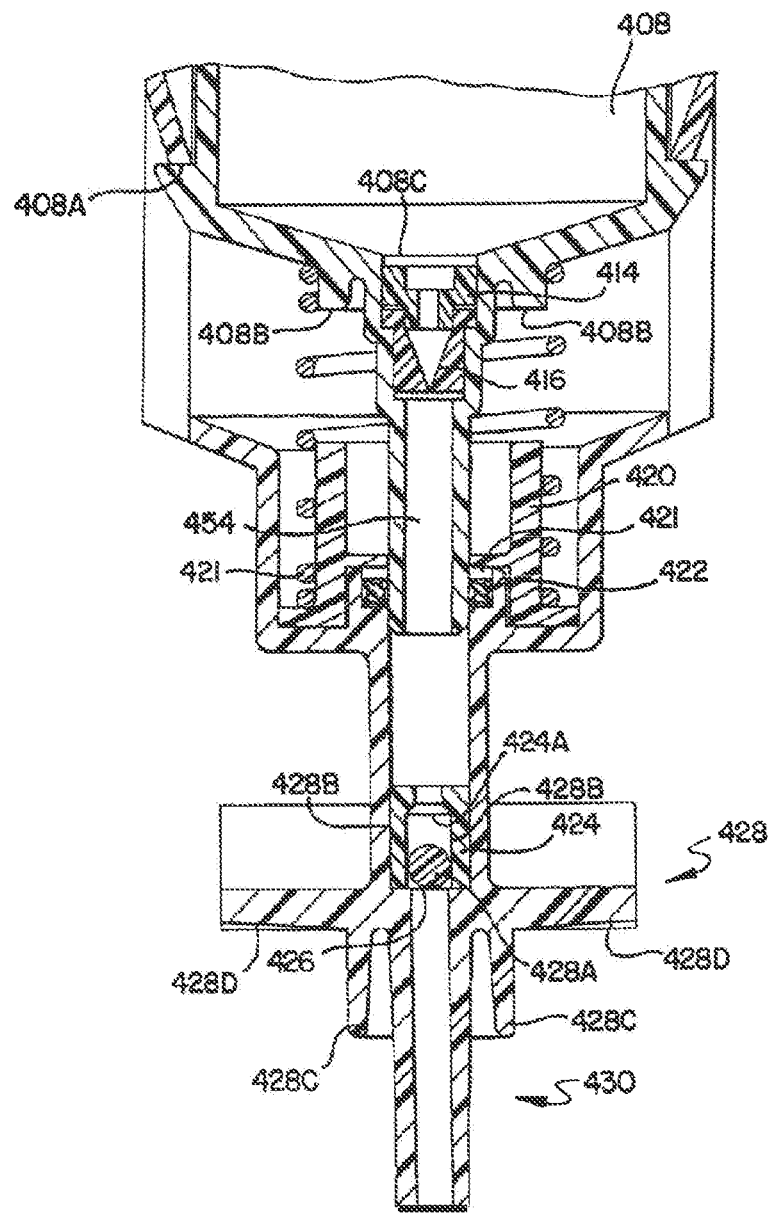
FIG. 17 is a cutaway view of the lower portion of the barrel, duckbill check valve, duckbill check valve insert, quad seal, ball, ball check valve insert and coupler of a fluid dispenser.

Referring to FIG. 17, there is shown a cutaway view of the lower portion of the barrel 408, duckbill check valve 416, duckbill check valve insert 414, quad seal 422, ball 426, ball check valve insert 424 and coupler 428 of a fluid dispenser 400. The barrel 408 has protrusions 408A, which mate with the coupler in order to, maintain the position of the barrel 408 on the upstroke. Otherwise, if the spring pushes the barrel 408 upward too high, the seal, as provided by the quad seal 422, may be broken thereby creating an air path and causing the fluid dispenser 400 to lose prime. The barrel 408 also has a flange 408B which mates with the stop 420 on the down-stroke. The barrel 408 also has a pocket 408C, where the duckbill check valve insert 414 is inserted. This pocket acts as a funnel so that no puddles are formed at the bottom of the barrel 408 at the interaction point with the duckbill check valve 416 or duckbill check valve insert 414, thereby minimizing waste. The barrel 408 also has at its lower portion a piston 454 by which fluid is expelled in the dispenser 400

FIG. 17A also shows a cutaway view of the coupler 428. The coupler 428 has grooves 428B in which the ball check valve insert 424 snaps. The grooves 428B act to prevent any leakage of fluid downward or air upward through the walls of the ball check valve insert 424 and the coupler wall. The coupler 428 also has protrusions 428C, which ensure that the dispenser is aligned on the reagent tray 10. For example, if the dispenser is misaligned, the dispense cylinder may not engage the dispenser properly. The coupler also has stabilizing bumps 428D, which reduce any rocking back and forth of the fluid dispenser 400.

Further, in an alternative embodiment as shown in FIG. 18A, there is shown a barrel 408 which has a lower section which acts as a piston 454 at its lower end, similar to FIGS.

12A-12C. Instead of a "through hole" at the bottom of the piston 454 at the lower section of the barrel in the piston area, there are holes 450 in the side of the piston 454 that contact O-ring seals 452. In this manner, when the barrel 408 is pushed downward, the holes 450 are exposed, dispensing fluid from the dispense chamber 412. When the barrel is returning to the up position, the pressure differential is such that the duckbill check valve 482 opens and fills the dispense chamber 412 with fluid. Because of the lack of a high pressure differential on the upstroke of the barrel, the duckbill check valve 482 in FIG. 18A is a duckbill check valve of low cracking pressure. Further, when the barrel is in the up position, the end of the piston 454A is closed by the O-ring seals 452 thereby sealing the bottom of the barrel 408 except for the holes 450.

Referring to another alternative embodiment as shown in FIG. 18B, there is shown a barrel 408 which has a lower section which acts as a piston 454 at its lower end, similar to FIG. 18A. Instead of placing O-ring seals 452 to cover the hole 450 in the lower end of the piston 454A, a quad seal 422.

Figure 20:
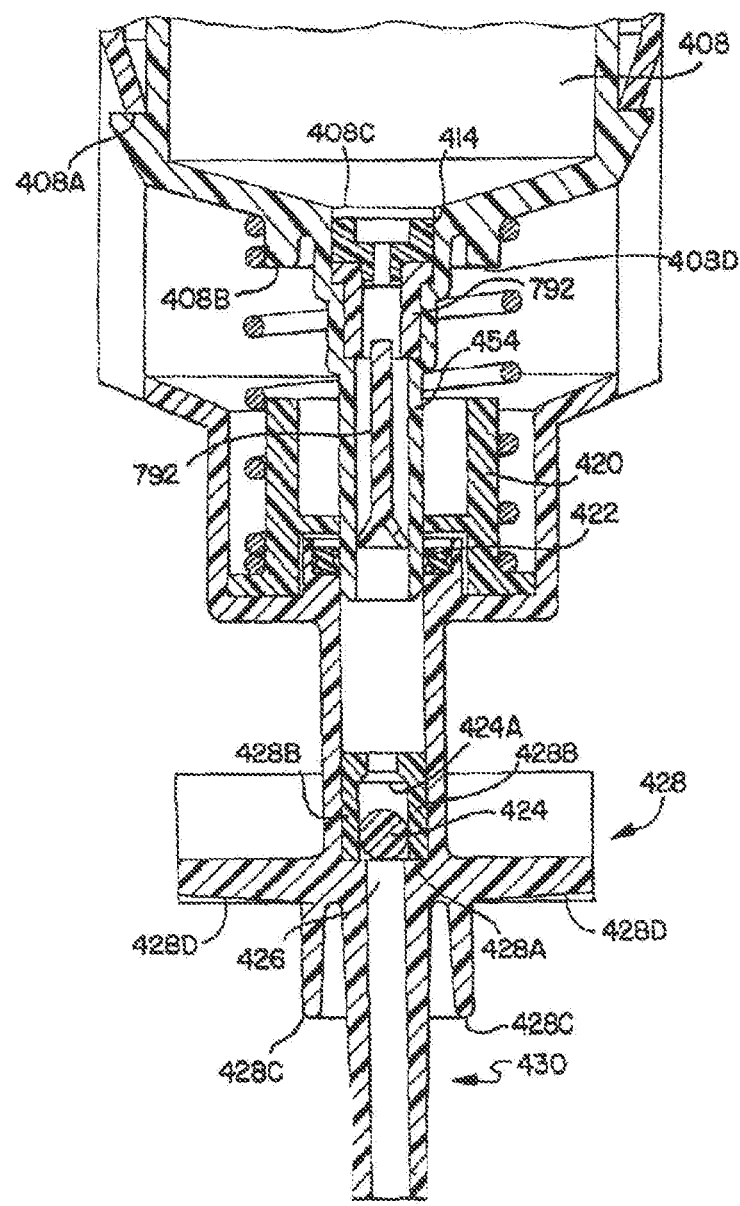
FIG. 20 is an alternative embodiment of a cutaway view of the lower portion of the fluid dispenser with a cup check valve.

Referring to FIG. 20, there is shown an alternative embodiment of a cutaway view of the lower portion of the fluid dispenser with a cup check valve 792. The lower portion of the cup check valve 792 (i.e., the cup piece 794) abuts against the piston 454 of the barrel 408, thereby disallowing liquid to pass through the lower portion of the barrel 408. The upper portion of the cup check valve 792, which is composed of an upper ledge 800 and side walls 802, abuts against the duckbill check valve insert 414 and the side of the piston 454. The cup check valve 792 operates in a manner similar to the duckbill check valve 416, as shown in FIG. 17A in that it operates based on a pressure differential. During the down-stroke of the barrel 408, the cup piece 794 of the cup check valve 792 remains rigid so that the piston, and the cup piece, push the liquid out of the dispense chamber 412. During the upstroke of the barrel 408, the ball 434 in the ball chamber 432 seats against the check valve ball insert 424, as described in FIG. 13A, creating a vacuum in the dispense chamber. This vacuum creates a pressure in the dispense chamber and in the adjacent piston area of the barrel 408, causing the cup piece 794 of the cup check valve 792 to flex inward, so that the cup piece 794 does not abut against the piston 454. When this occurs, fluid in the reservoir chamber is allowed to pass around the cup check valve 792 and into the dispense chamber. The cup piece 794 is flexed inward until the pressure equalizes between the dispense chamber and reservoir chamber. As such, the dispense chamber receives fluid on the upstroke of the barrel 408. For better flexing effect due to the vacuum caused in the dispense chamber, the cup piece 794 of the cup check valve 792 should sit low in the piston 454 of the barrel 408. In this manner, the less area under the cup, the more suction effect caused by the vacuum.

Figure 19:
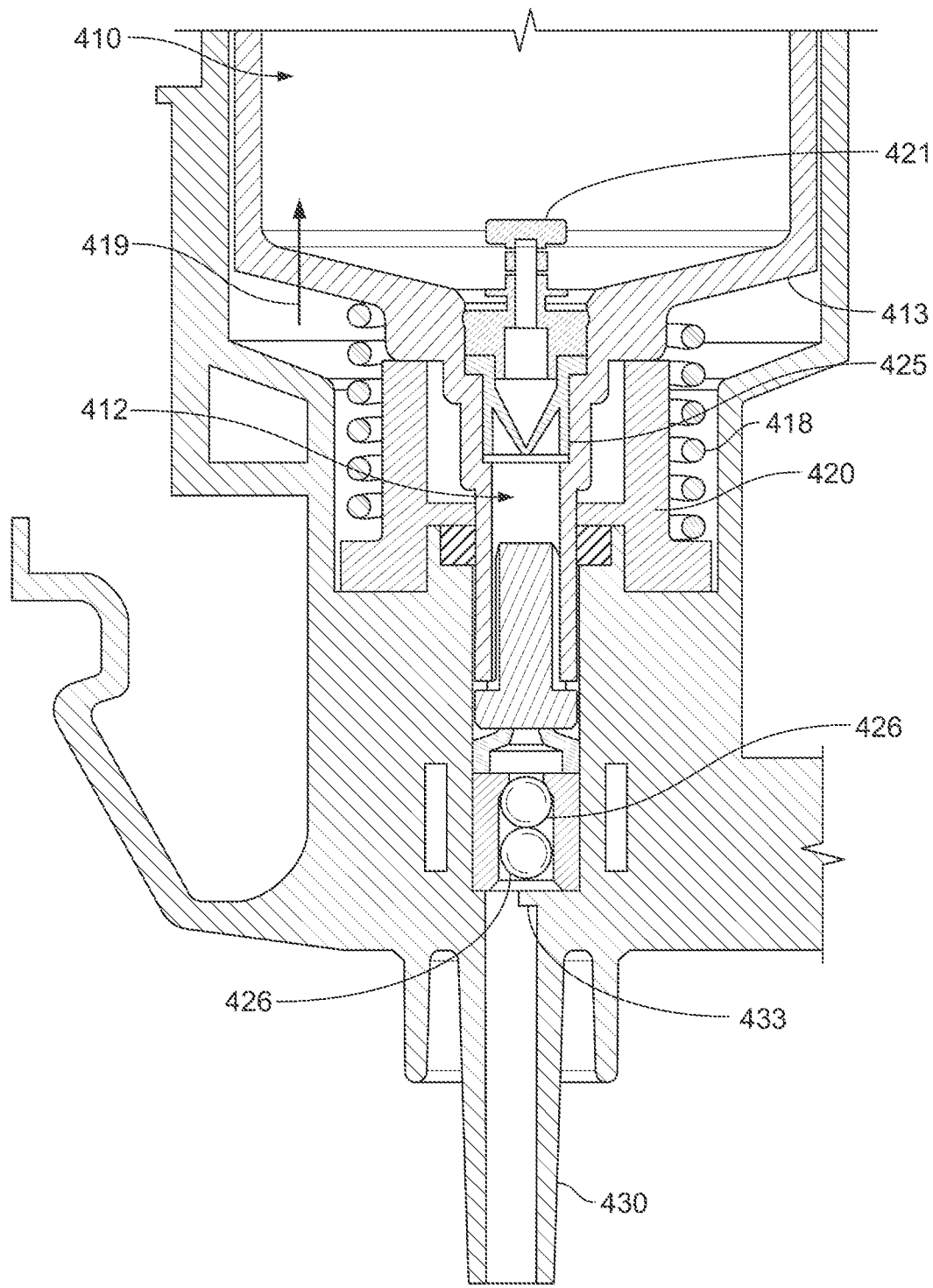
FIG. 19 is a cross-sectional view of a dispenser comprising an optional filter device.

In some embodiments, such as depicted in FIG. 19, the dispenser may comprise a filtering device 421 positioned between the reservoir chamber 410 and a valve 425, the filtering device comprising a filtering element. In some embodiments, the filtering element allows reagents, fluids, etc. to flow through towards the valve while substantially blocking precipitates or other contaminates, such as those having a particular threshold size. Filtering elements may include one or more screens, meshes, filter papers, membranes (e.g., permeable membranes, semi-permeable membranes, porous membranes, etc.), bed of media (e.g., a bed of material that retains solid particles), cloth, combinations thereof, or other types of filtering elements capable of blocking, trapping, or otherwise retaining particles. If the filtering element tends to promote nucleation and subsequent precipitation of relatively large solid particles, multiple filtering elements can be employed to ensure that precipitates are trapped. In some embodiments, the filter device is positioned at a bottom of the reservoir chamber, the filter device further comprising a main body that extends upwardly partially through the reservoir chamber, and the filtering element is positioned along a sidewall of the main body of the filter device. In some embodiments, the filter device includes a protective cantilevered member extending laterally outward from the main body of the filter device such that the protective cantilevered member blocks particles, which are located in the reservoir chamber, from moving vertically towards the filtering element. In some embodiments, the filtering element is configured to substantially block precipitates having outer diameters equal to about 0.01 inch. Other configurations of filtering devices, filtering elements, and dispensers comprising the same are disclosed in U.S. Pat. No. 8,790,596, the disclosures of which are hereby incorporated by reference herein in their entirety.

Figure 21:
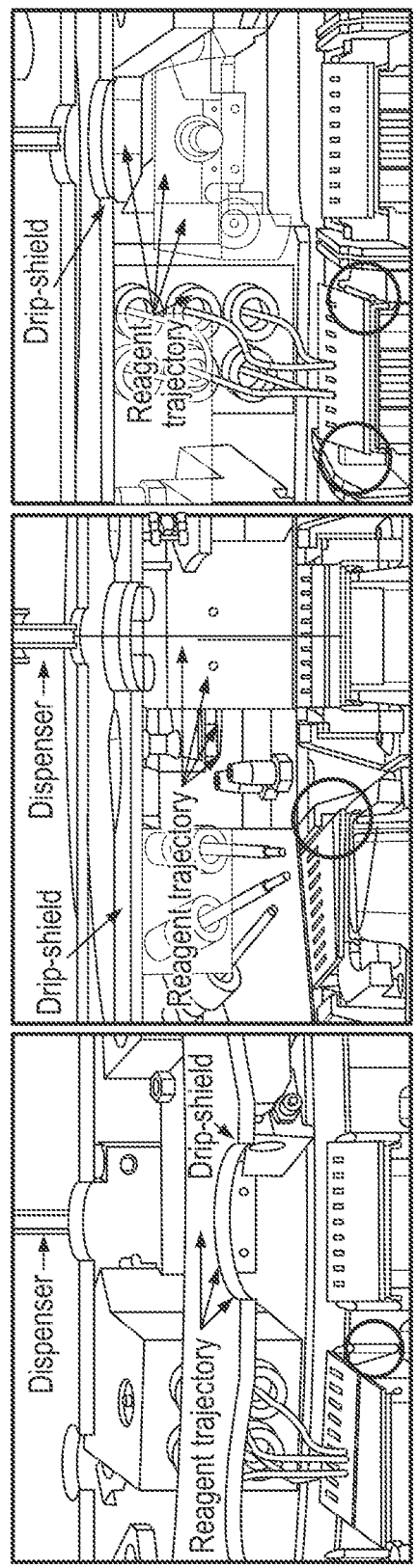
FIG. 21 illustrates a drip shield positioned between adjacent slide supports.

In some embodiments, the processing system comprises a drip shield positioned between the dispenser tip and the glass slide. In some embodiments, the drip shield reduces or prevents reagents or other fluids from impacting a slide adjacent to the slide intended to receive the reagents or other fluids (see, FIG. 21). In some embodiments, a vertical positioning of the drip shield in relation to the slide may reduce or prevent reagents or other fluids having a certain fluid path, such as a fluid path that deviates from that desired, from impacting an adjacent slide (see, FIG. 21). In some embodiments, the drip shield (not shown) is positioned between two adjacent slide supports 26 of the slide carousel 24 (see, e.g., FIG. 2). In some embodiments, the drip shields extend vertically (z-axis) from the carousel 24, such as from between about 0.25 cm to about 3 cm from the surface of the carousel 24.

The vertical position of the drip shield, and its hole diameter size aligned axially below the dispenser nozzle, determines an angle of a fluid path diversion between the drip shield would allow through, or interfere with. The purpose of interfering with the fluid trajectory would be to protect neighboring slides from receiving an errant fluid dispense.

Methods and Devices for Mitigating the Accumulation of Reagent Build-Up within Dispense Nozzles During or after use of the fluid dispenser and/or automated biological processing system 80 described above, the dispense nozzle 430 of the dispenser may be left exposed to the environment, thereby permitting evaporation of any reagents or fluids within the bore of the nozzle. Indeed, after one or more evaporation cycles, any remaining reagent residue may accumulate within the bore and/or envelope the tip of the dispense nozzle 430. Without wishing to be bound by any particular theory, it is believed that the accumulated material may adversely affect the trajectory accuracy of subsequent reagent or fluid dispense cycles from the fluid dispenser of the biological processing system. For example, material may accumulate and form a shape which may cause a dispense stream of reagent or fluid to be at an angle, with the possibility that the reagent may miss the glass slide below it. The present disclosure provides active and passive methods for preventing or mitigating the accumulation of material within the bore of the dispense nozzle and, if material does accumulate therein, the present disclosure provides additional devices or mechanisms for removing or reducing at least a portion of the accumulated material.

In some embodiments, the dispense nozzle may comprise features which serve as a means for reducing or otherwise mitigating build-up of reagent material within the bore of the nozzle or enveloping its tip. In some embodiments, the dispense nozzle comprises a material that is hydrophobic or oleophobic. In other embodiments, the dispense nozzle comprises a coating which is hydrophobic or oleophobic. Without wishing to be bound by any particular theory, it is believed that a dispense nozzle derived from such a material or comprising such a coating may serve as a means for mitigating the build-up of reagent material within the bore of the nozzle or enveloping its tip.

Figure 15:
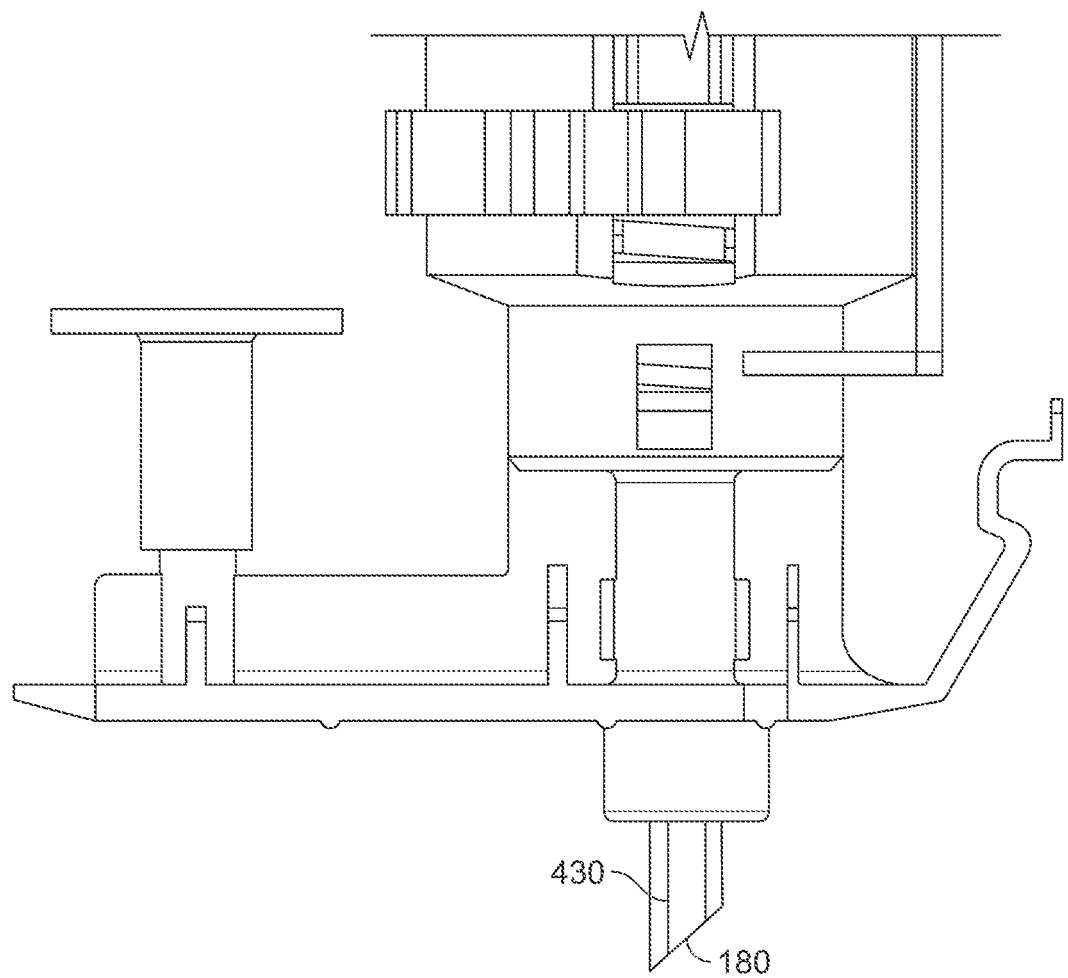
FIG. 15 illustrates a dispenser having a dispense nozzle with a beveled tip.

In some embodiments, the features incorporated within the dispense nozzle are structural features. In some embodiments, a slit or valve (not shown) may be incorporated within the dispense nozzle 430, e.g. positioned at the distal end of the dispense nozzle 430 to act as a barrier between the fluid present and the environment so as to prevent evaporation. In some embodiments, the dispense nozzle comprises a silicone slit-valve. In some embodiments, slit is designed to alter the spray pattern and/or dispense velocity. In some embodiments, the dispense nozzle 430 comprises a beveled tip (180) as illustrated in FIG. 15, or a keyhole cutout at a distal portion of the dispense nozzle such that the altered exit hole would bias the exiting fluid to aim in a preferred direction rather than a random direction. In yet other embodiments, the dispense nozzle itself is able to be removed from the dispenser and replaced with another dispense nozzle, e.g. a clean dispense nozzle or a new/unused dispense nozzle.

In some embodiments, the means is a variation in an internal diameter of the dispense nozzle 430 so as to increase or decrease the velocity of the reagent and/or fluid being dispensed from the dispenser. In some embodiments, the internal diameter of the dispense nozzle 430 may range from about 0.10 inches to about 0.14 inches. In some embodiments, the internal diameter of the dispense nozzle 430 may range from about 0.09 inches to about 0.15 inches.

Figure 16A:
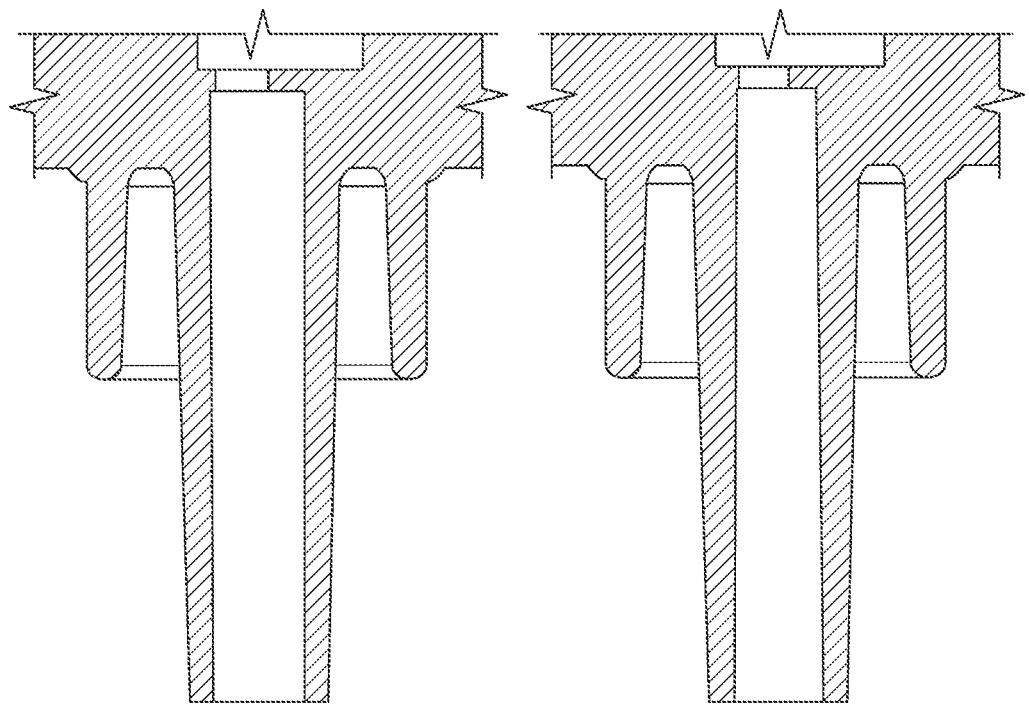
FIG. 16A compares two dispense nozzles, one having no draft (left) and one having a draft (right)
Figure 16B:
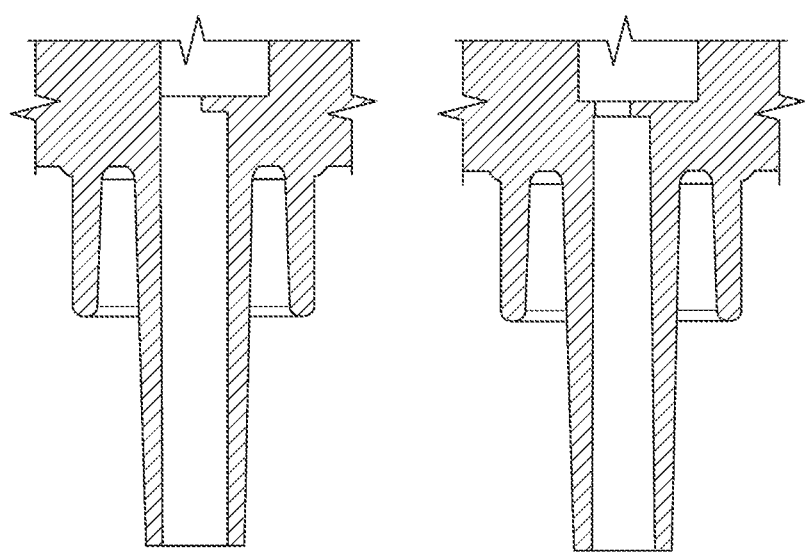
FIG. 16B compares two dispense nozzles, one having no draft (left) and one having a draft (right)

In other embodiments, and as depicted in FIG. 16, the dispense nozzle may comprise a draft angle, i.e. a taper of the dispense nozzle originating at a first wider point and terminating at a second narrower point. In other embodiments, the dispense nozzle may comprise a draft angle ranging from between about 0° to about 1°. In other embodiments, the dispense nozzle may comprise a draft angle ranging from between about 0.1° to about 1°. In other embodiments, the dispense nozzle may comprise a draft angle ranging from between about 0.2° to about 0.8°. In other embodiments, the dispense nozzle may comprise a draft angle ranging from between about 0.3° to about 0.7°. In other embodiments, the draft angle is 0°. In some embodiments, the draft angle is about 0.5°. In some embodiments, the dispense nozzle may taper from an initial internal diameter of 0.075 inches to about 0.15 inches. In other embodiments, the dispense nozzle may taper from an initial internal diameter of 0.08 inches to about 0.10 inches. In yet other embodiments, the dispense nozzle may taper from an initial internal diameter of 0.089 inches to about 0.098 inches.

Figure 8A:
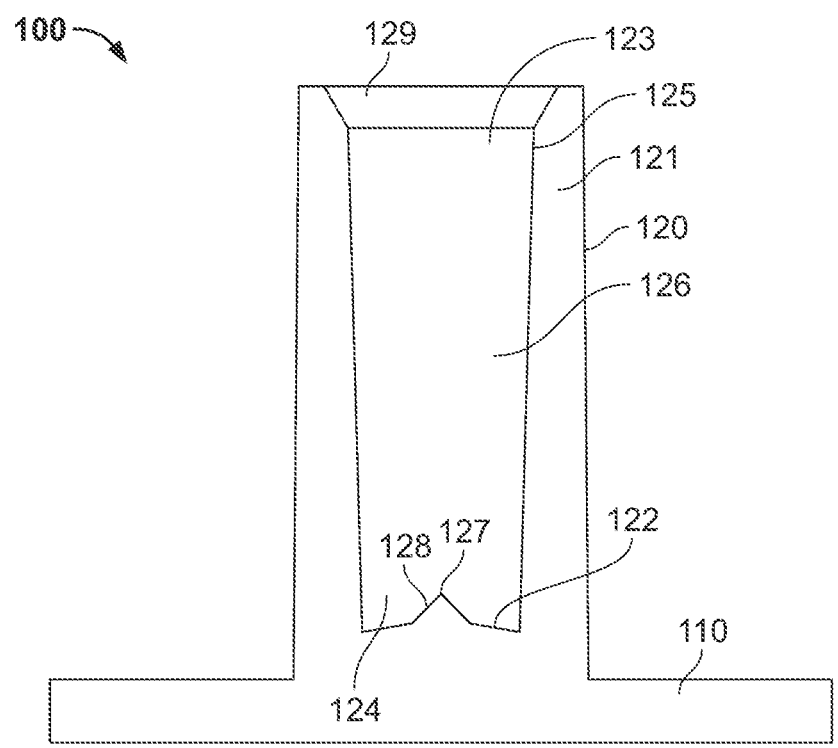
FIG. 8A is a cross-sectional view of a nozzle cap comprising a retention member.

In some embodiments, the means is a nozzle cap designed to prevent, mitigate, or remove films or build-up of reagent material within the bore of the dispense nozzle or enveloping its tip. FIG. 8A illustrates a non-limiting embodiment of a nozzle cap 100 of the present disclosure. In some embodiments, the nozzle cap 100 comprises a base 110 and a retention member 120. The retention member 120 is designed to releasably engage at least a portion of a dispense nozzle 160, thereby releasably securing the nozzle cap 100 onto the dispense nozzle 160 as illustrated in FIG. 8C. In some embodiments, the nozzle cap 100 is designed so as to form a seal, e.g. an airtight seal or a fluid tight seal, between the retention member 120 and a bore 161 of the dispense nozzle 160.

The base 110 of the nozzle cap 100 may have any size and shape, e.g. a polygonal shape or a circular shape. In some embodiments, the base 110 is polygonal and may have between 3 and 8 sides, each side having a length ranging from between about 0.5 cm to about 6 cm. In other embodiments, the base 110 is circular and may have a diameter ranging from between about 1 cm to about 6 cm. In yet other embodiments, the base 110 is ovoid and may have a diameter, at its widest part, ranging from between about 1 cm to about 6 cm.

Figure 8B:
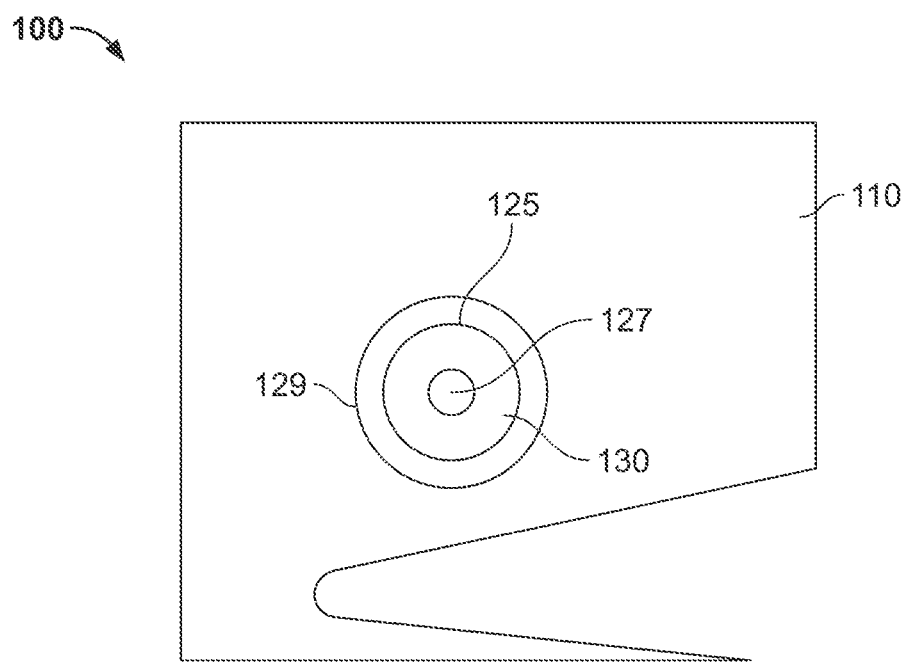
FIG. 8B is a top view of a nozzle cap comprising a retention member.
Figure 8C:
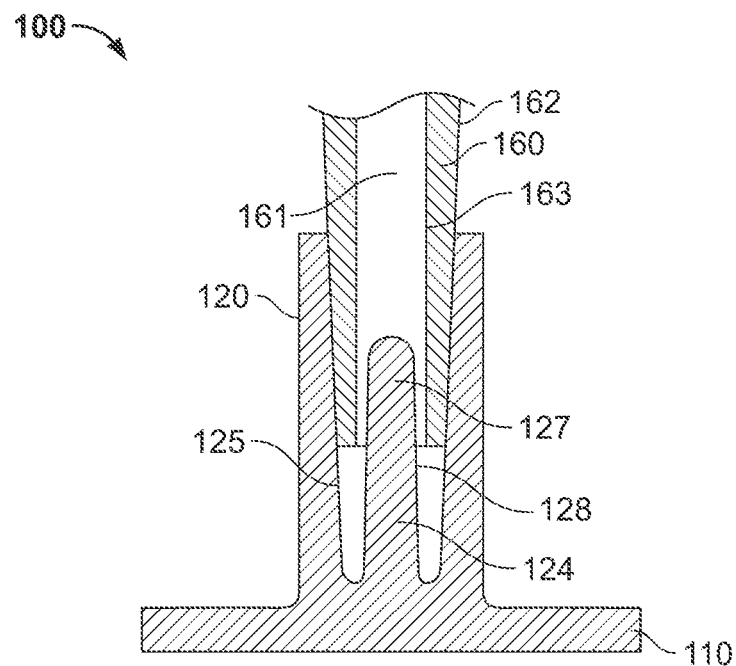
FIG. 8C is a cross-sectional view of a nozzle cap comprising a retention member and a dispense nozzle inserted herein.
Figure 8D:
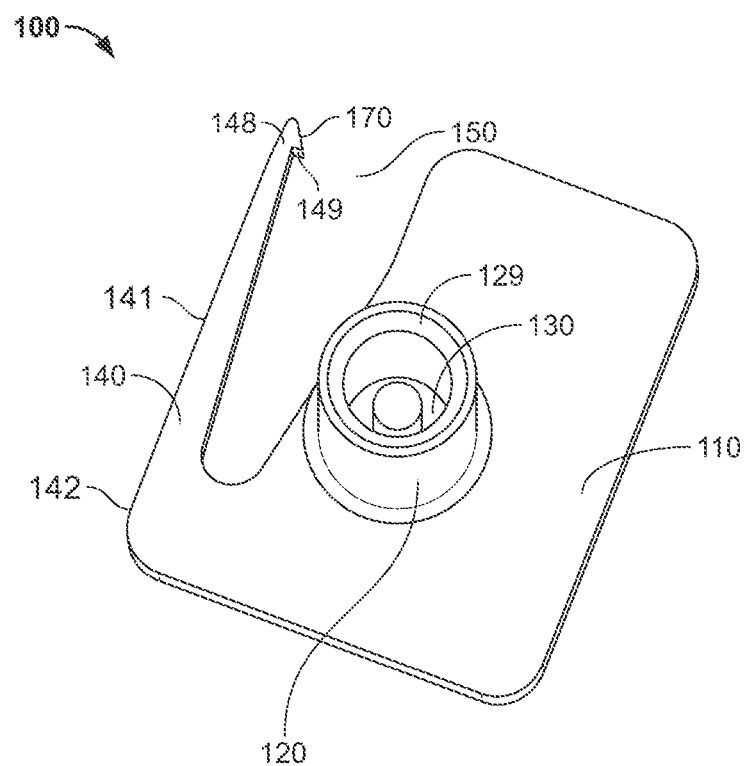
FIG. 8D is a perspective view of a nozzle cap comprising a retention member.

With reference to FIGS. 8A and 8B, the retention member 120 comprises an outer body portion 121 having an opening at a first end 123 and a closed second end 124. In some embodiments, the outer body portion 121 comprises a first rim 129 which follows the perimeter of an outermost portion of the outer body portion 121. In some embodiments, the retention member 120 further comprises an inner body portion 122 spaced apart from the outer body portion 121. In some embodiments, the inner body portion 122 is substantially centered within the outer body portion 121. In some embodiments, the inner body portion 122 is spaced between about 0.5 mm and about 4 mm from the outer body portion 121. In some embodiments, the inner body portion 122 is spaced between about 1.5 mm and about 3 mm from the outer body portion 121. In some embodiments, the opening at the first end 123, the closed second end 124, and an inner surface 125 of the outer body portion 121 define a lumen 126 into which the dispense nozzle 160 may be inserted (see also FIG. 8C). In some embodiments, a second rim 130 is defined by the space between the outer body portion 121 and the inner body portion 122. In some embodiments, the lumen 126 runs from the first rim 129 to the second rim 130 (see FIGS. 8B and 8D).

In some embodiments, the inner body portion 122 comprises a protuberance 127 that extends from the base 110 and into the lumen 126. In some embodiments, the protuberance 127 is configured to be at least partially inserted into the bore 161 of the dispense nozzle 160 (see FIG. 8C). In some embodiments, the protuberance 127 is configured such that at least a portion of its surface 128 contacts, e.g. frictionally engages, an interior surface 163 of the bore 161. In other embodiments, the protuberance 127 is configured such that the entire length of the protuberance is in contact with the interior surface 163 of the bore 161. In some embodiments, the protuberance has a length ranging from about 1 mm to about 6.5 mm.

The protuberance 127 may have any size or shape, provided that at least a portion of the protuberance is capable of being inserted into the bore 161 of the dispense nozzle 160. In other embodiments, the protuberance has a cylindrical shape but with one or more flat planes on the outside. In some embodiments, the protuberance has a substantially cylindrical shape. In yet other embodiments, the protuberance has a conical shape. In yet other embodiments, the protuberance has a polygonal shape. In some embodiments, the protuberance tapers from a first cross-sectional dimension proximal the inner body portion to a second cross-sectional dimension at or near its tip. The tip of the protuberance may have any shape, e.g. a rounded tip, a pointed tip, a pyramidal tip, or a flat tip.

Likewise, the outer body portion 121 of the retention member 120 may have any shape or size. In some embodiments, the outer body portion 121 is substantially cylindrical in shape. In other embodiments, the outer body portion 121 may have a polygonal shape. Of course, the skilled artisan will appreciate that while the outer body portion 121 may have a certain exterior shape, its interior shape may be different. For example, while the exterior shape of the outer body portion may have a substantially square shape, an interior shape may be substantially cylindrical, thereby defining a lumen 126 that has a substantially cylindrical shape, e.g. to mate with a dispense nozzle 160 having a substantially cylindrical shape.

In some embodiments, the lumen 125 conforms to a Luer taper design adapted to engage an outer surface of the dispense nozzle. In some embodiments, the Luer taper design has dimensions which, when the retention member and dispense nozzle are brought into contact with each other, permits for frictional engagement between the inner surface 125 of the outer body portion 121 of the retention member 120 and an outer surface 162 of the dispense nozzle 160. In other embodiments, the lumen 126 has a substantially cylindrical shape, where the interior sidewalls of the outer body portion are perpendicular to the base 110.

In some embodiments, the nozzle cap 100 further comprises a member for reducing, removing, or breaking-up material accumulated on an interior surface 163 of the bore 161 of the dispense nozzle 160 or enveloping the opening of the dispense nozzle 160. In some embodiments, the member is a tool integrated with or attached to the nozzle cap that may be manually inserted into the dispense nozzle to reduce, remove, or break-up the accumulated material. For example, the member may comprise an elongate shank integrated with or attached to the nozzle cap, the elongate shank sized to fit at least partially inside the bore of the dispense nozzle.

With reference to FIGS. 9A through 9F, in some embodiments the means for reducing, removing, or breaking-up accumulated material is a probe tool device 140. In general, the probe tool 140 is adapted for at least partial insertion into the bore 161 (e.g. between 10 mm and 25 mm) of the dispense nozzle 160. In some embodiments, the probe tool 140 is connected to or integral with the base 110. In this way, the base 110 serves as a "handle" for manipulation and use of the probe tool 140. In some embodiments, the entirety of the probe tool 140 is in the same plane as the base 100. In other embodiments, a portion of the probe tool extends out of the plane of the base. For example, a barb, hook, or other geometric protrusion may emanate from an upper surface the probe tool and out of the plane of the base, as described further herein.

Figure 9A:
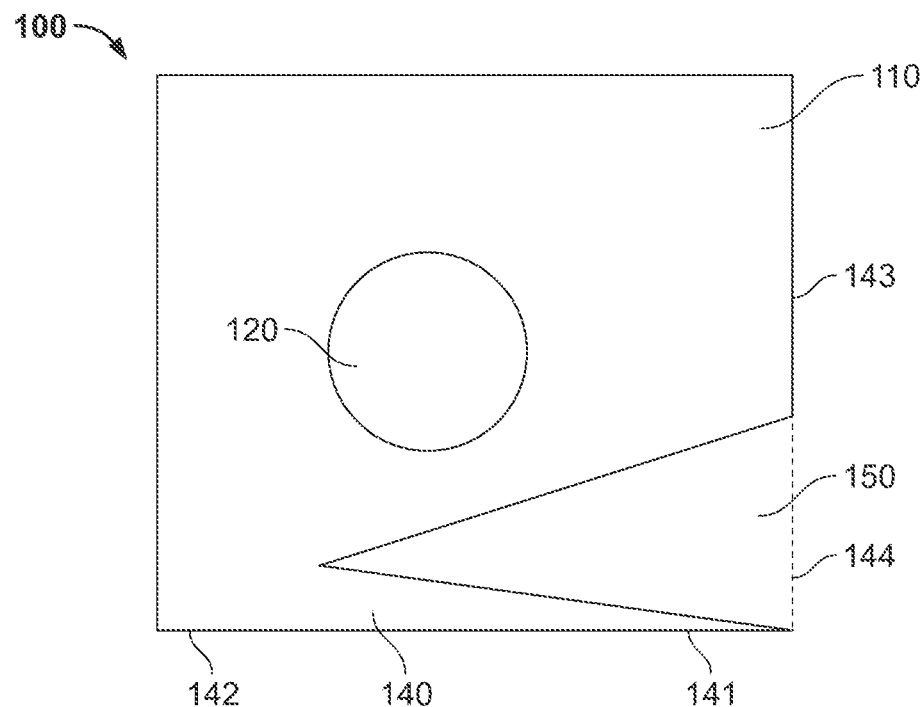
FIG. 9A provides a top view of a first embodiment of a nozzle cap in accordance with one embodiment of the present disclosure.

In some embodiments, the probe tool comprises an elongate body 141, the elongate body 141 extending from a portion of base 110. In some embodiments, at least one side of the elongate body 141 is adjacent to a cutaway 150 in the base 110. In some embodiments, the probe tool 140 is integral with a first edge of the base 142, such as illustrated in FIG. 9A. In other embodiments, the probe tool 140 extends from a posterior portion of the cutaway 150 as depicted in FIGS. 9C through 9F, i.e. the probe tool is located within the cutaway 150 or emanates from the cutaway 150. In some embodiments, the elongate body 141 terminates in a tip 148, which may be blunt (e.g. a rounded tip or a squared-off tip) or pointed (see, e.g., FIG. 11B). In some embodiments, the tip 148 serves to at least puncture material enveloping the opening of the dispense nozzle 160.

In some embodiments, the tip 148 comprises shoulder 149. The shoulder 149 may have any depth, provided that the tip 148 and shoulder 149 together fit within the bore 161 with sufficient room for maneuverability of at least a portion of the probe tool 140 therein. In some embodiments, the shoulder 149 has a height ranging from about 0.2 mm to about 0.8 mm.

In some embodiments, the probe tool, whether integral with an edge of the base or located within a cut-away, has a length which does not extend past any edge of the base. In other embodiments, the probe tool has a length which does extend past an edge of the base. In some embodiments, the probe tool has a length ranging from between about 5 mm to about 16 mm. In other embodiments, the probe tool has a length ranging from between about 8 mm to about 12 mm.

Figure 9B:
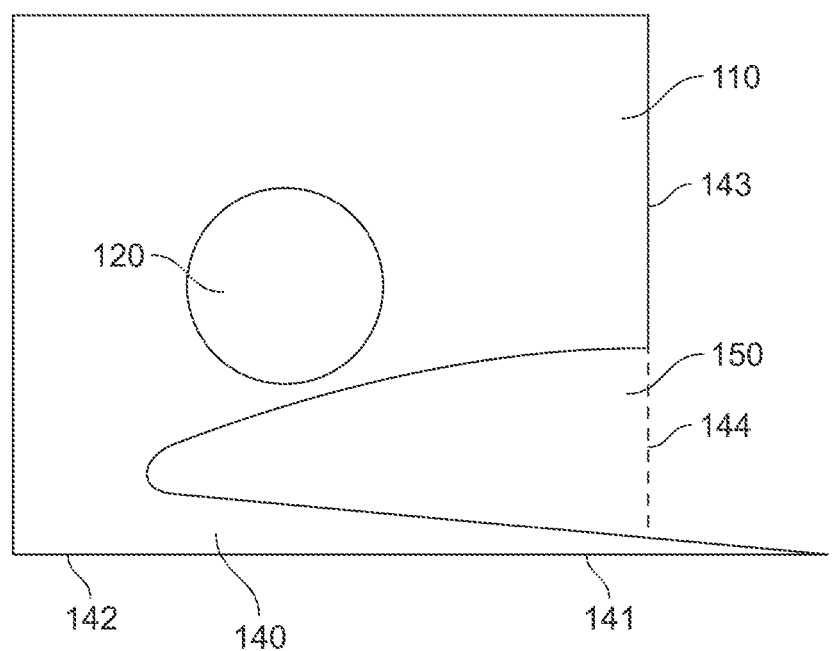
FIG. 9B provides a top view of a second embodiment of a nozzle cap in accordance with one embodiment of the present disclosure.
Figure 9C:
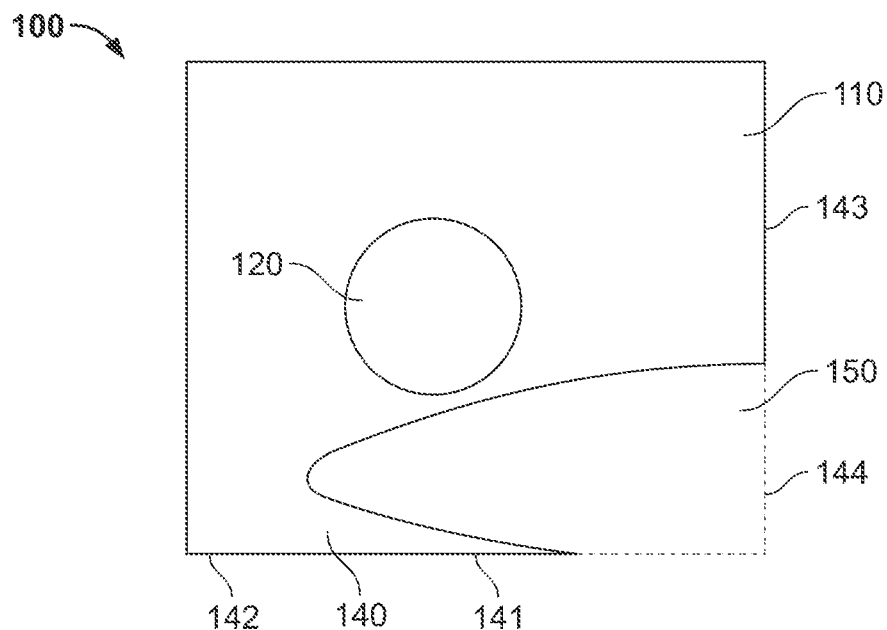
FIG. 9C provides a top view of a third embodiment of a nozzle cap in accordance with one embodiment of the present disclosure.

For example, FIGS. 9A and 9C depict a nozzle cap 100 having a polygonal base and a probe tool 140 which is integral with a first edge 142 of the base 110. The elongate body 141 of the probe tool has a length which does not extend past a line 144 continuous with a second edge of the base 143. On the other hand, FIG. 9B depicts an embodiment where the elongate body 141 extends past a line 144 continuous with a second edge 143 of the base 110.

Figure 9D:
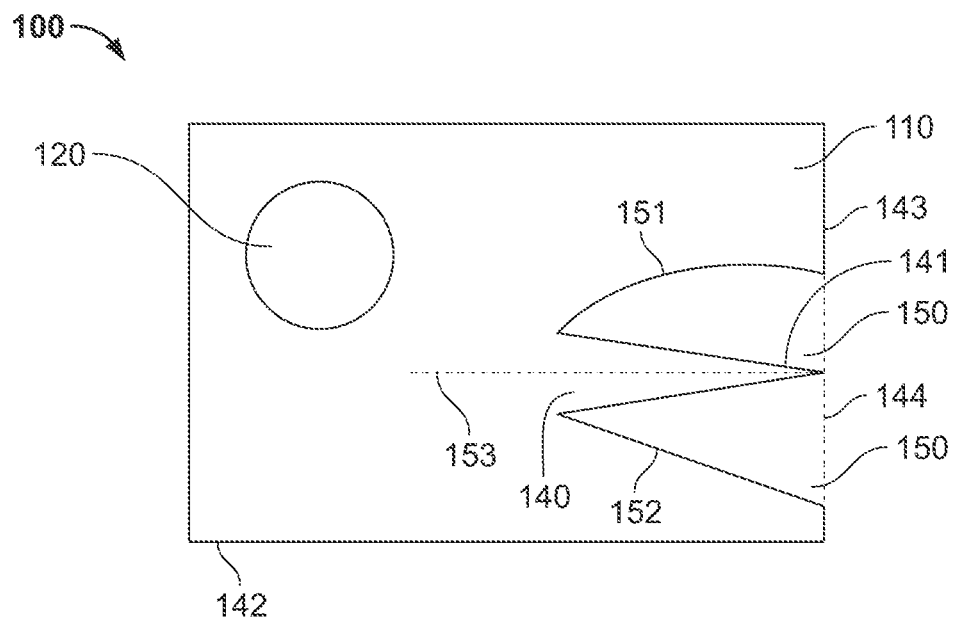
FIG. 9D provides a top view of a fourth embodiment of a nozzle cap in accordance with one embodiment of the present disclosure.
Figure 9E:
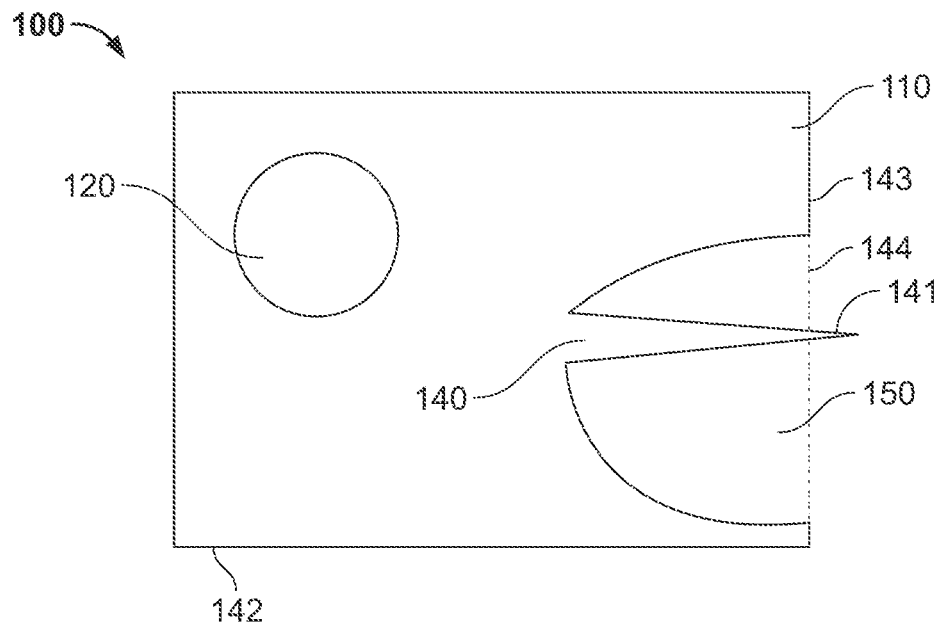
FIG. 9E provides a top view of a fifth embodiment of a nozzle cap in accordance with one embodiment of the present disclosure.

Likewise, FIGS. 9D and 9E depict a nozzle cap 100 having a polygonal base and a probe tool 140 located within a cutaway 150 of the polygonal base. The elongate body 141 of the probe tool is depicted as having a length which does not extend past the bisection of a line running through the center of the elongate body 153 and a line 144 continuous with an edge 143 proximate the distal end of the elongate body. In other embodiments, such as illustrated in FIG. 9E, the length does extend past the bisection of the two lines 143 and 144.

Figure 9F:
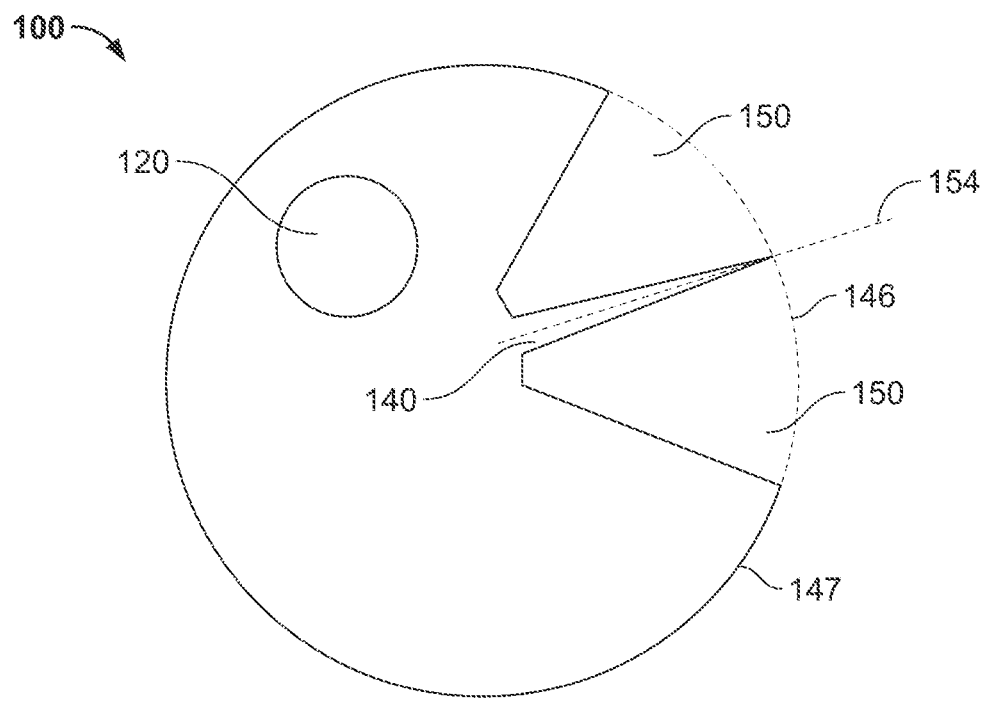
FIG. 9F provides a top view of a sixth embodiment of a nozzle cap in accordance with one embodiment of the present disclosure.

Similarly, FIG. 9F depicts a nozzle cap 100 having a circular base 110 and a probe tool 141 located within a cutaway 150 of the circular base 110. The elongate body of the probe tool is depicted as having a length which does not extend past the bisection of a line running through the center of the elongate body 154 and an arc 146 continuous with a circumferential edge 147 of the base 110.

Figure 10A:
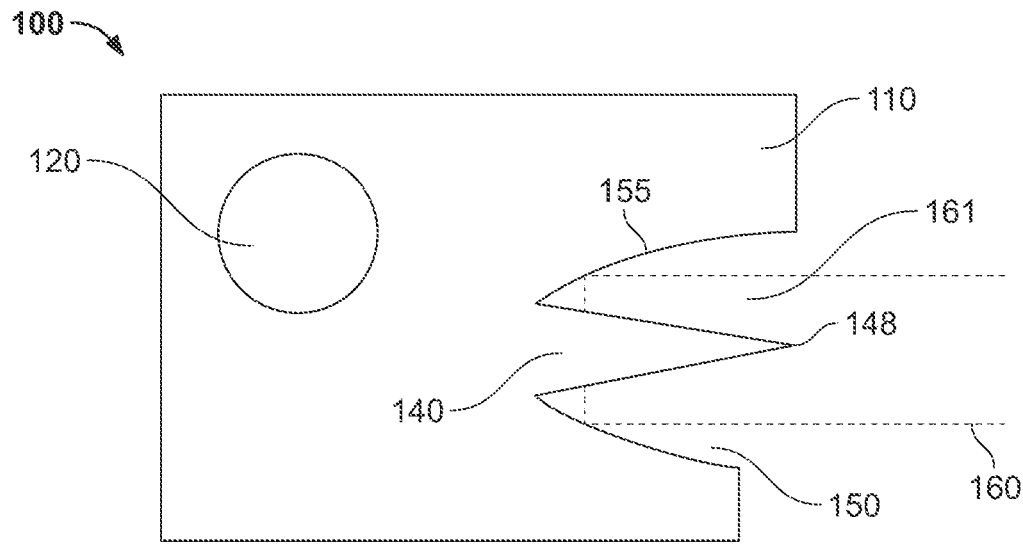
FIG. 10A provides a top view of a first embodiment of a nozzle cap comprising a retention member and a probe tool in accordance with one embodiment of the present disclosure.
Figure 10B:
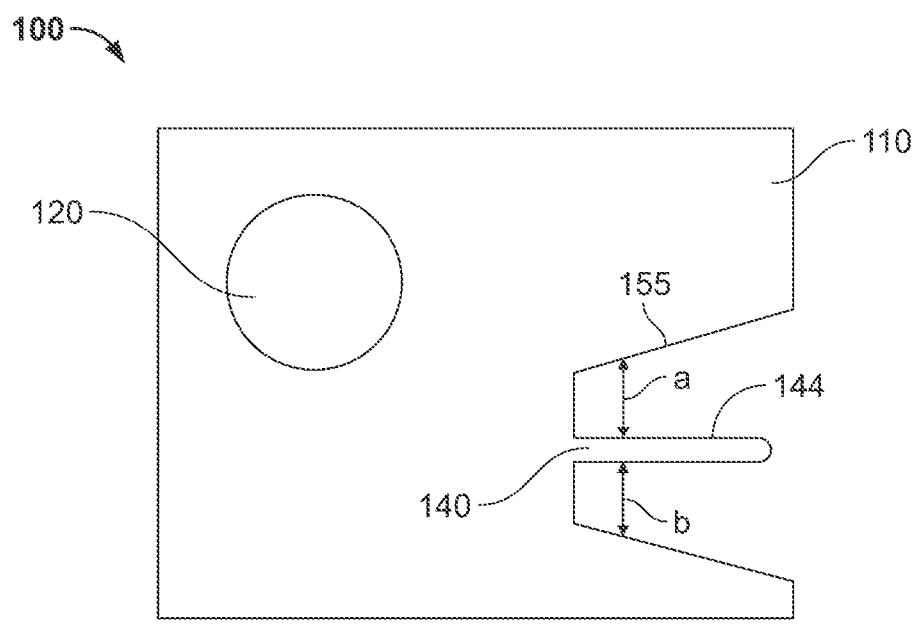
FIG. 10B provides a top view of a second embodiment of a nozzle cap comprising a retention member and a probe tool in accordance with one embodiment of the present disclosure.

The skilled artisan will appreciate that the sizing and/or shape of the cutaway 150, the width and/or shape of the probe tool 140, and/or the length of the probe tool 140 may be varied to as to physically limit the depth to which the probe tool 140 may be inserted into the bore 161 of the dispense nozzle 160. In some embodiments, the elongate body 141 may have any size and shape, provided that the elongate body 141 is capable of being at least partially inserted into the bore 161 of the dispense nozzle 160, such as illustrated in FIG. 10A. In some embodiments, the elongate body has a flat shape lying within the plane of the base. In some embodiments, the elongate body may have a cylindrical or conical shape where portions protrude out of the plane of the base. In some embodiments, and regardless of whether the probe tool 140 is integral with an edge of the base or located entirely within the cutaway, the probe tool is distanced sufficiently from walls 155 of the cutaway 150 so as to allow the probe tool 140 to be at least partially inserted into the bore 161 of the dispense nozzle 160 (see distances "a" and "b" of FIG. 10B). In this way, the walls of the cutaway serve to prevent the probe tool from being inserted too far into the bore of the dispense nozzle, i.e. the walls 155 of the cutaway 150 serve to limit travel of the probe tool into the bore 161.

Figure 10C:
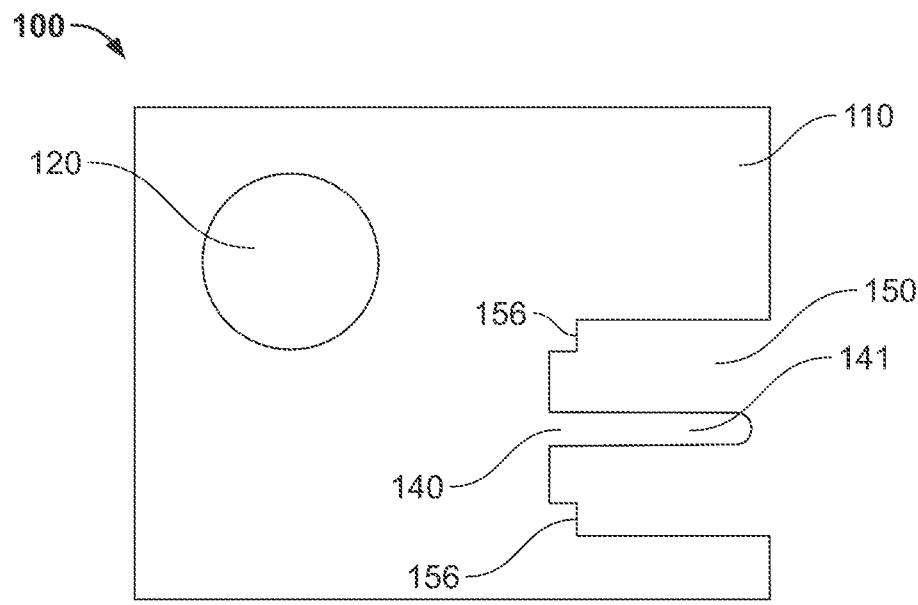
FIG. 10C provides a top view of a third embodiment of a nozzle cap comprising a retention member and a probe tool in accordance with one embodiment of the present disclosure.
Figure 10D:
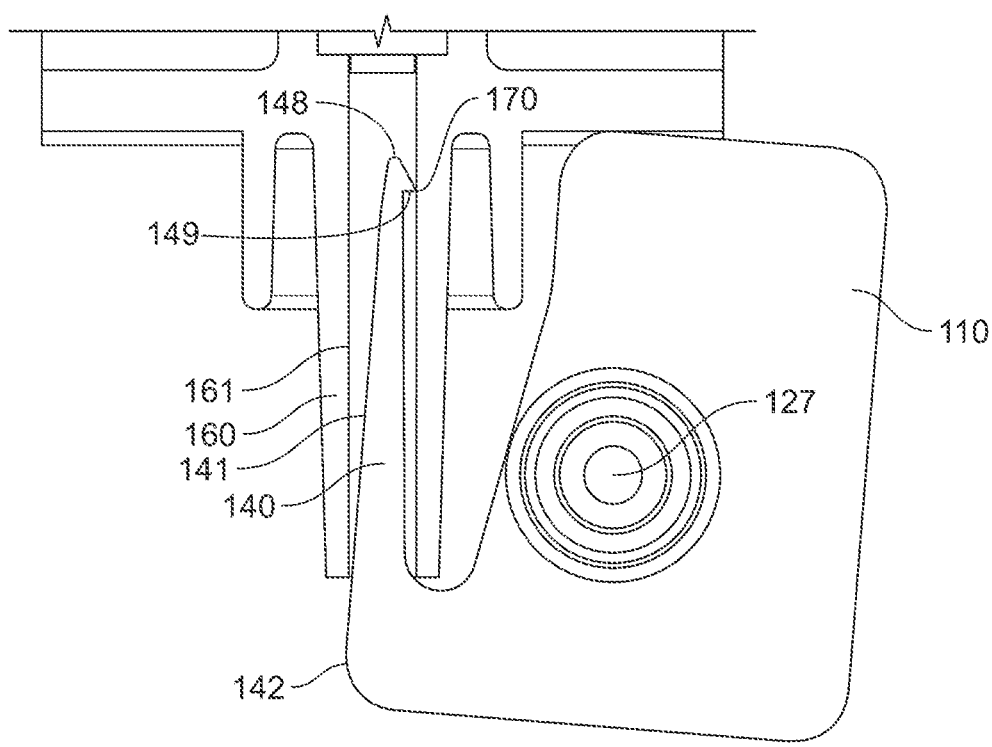
FIG. 10D provides a cross-sectional view of a dispense nozzle having a probe tool inserted therein.

In some embodiments, the cutaway 150 is adapted such that it physically impedes certain movements of the dispense nozzle 160 or limits the depth to which the dispense nozzle 160 may be inserted into the cutaway 150, thereby limiting how deep the probe tool 140 may be inserted into the bore 161. For example, and with reference to FIG. 9D, non-linear walls 151 or walls diagonal 152 relative to an edge 143 may allow for the probe tool 140 to be inserted at different depths into the bore 161 depending on the outer diameter of the dispense nozzle 160. In this way, a single cutaway 150 may accommodate differently sized dispense nozzles. Likewise, and as depicted in FIG. 10C, the cutaway 150 may also comprise stop blocks 156 or other means to prevent the probe tool 140 from being inserted too far into the dispense nozzle. The skilled artisan will appreciate that by varying the distance between any wall 155 or stop 156 and the probe tool 140, a cutaway 150 may be provided that allows for manipulation of the probe tool within the dispense nozzle, while mitigating damage to the dispense nozzle (e.g. by restricting the movement of the probe tool in relation to the dispense nozzle or the depth in which the probe tool may be inserted).

In some embodiments, the elongate body has a width that is less than the internal diameter of the bore. In other embodiments, the elongate body has a width that is less than half the internal diameter of the bore. In yet other embodiments, the elongate body has a width ranging from 1.1 mm to about 1.8 mm. In further embodiments, the elongate body has a width ranging from 0.6 mm to about 1.1 mm.

Figure 11A:
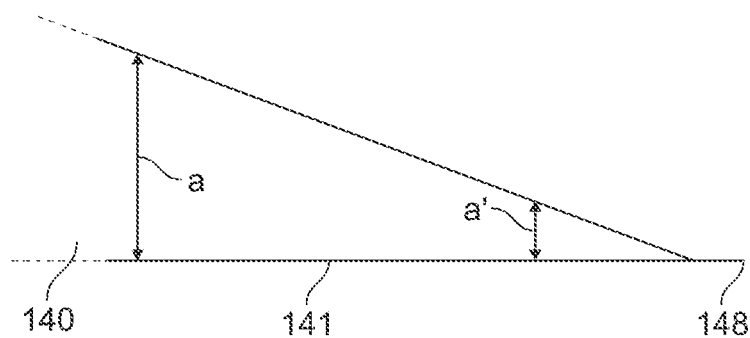
FIG. 11A provides a cross-sectional view of a probe tool terminating in a tip.
Figure 11B:
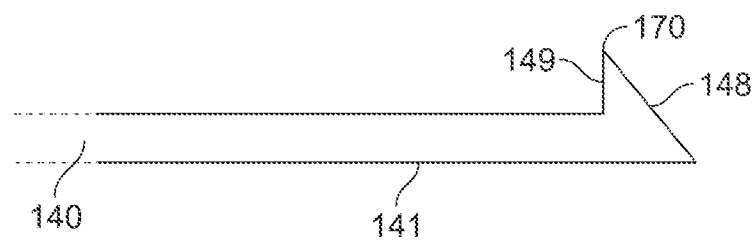
FIG. 11B provides a cross-sectional view of a probe tool comprising a tip.
Figure 11C:
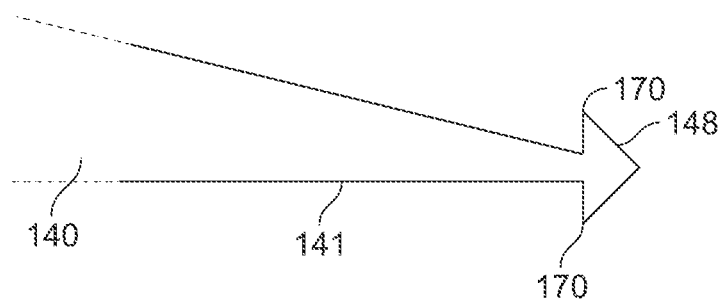
FIG. 11C provides a top view of a probe tool having two abrading means.

In some embodiments, the elongate body has a tapered shape as depicted in FIGS. 11A and 11C. In some embodiments, the elongate body tapers from a first cross-sectional dimension (e.g. dimension a) located at or near a junction of the elongate body and the base to a second cross-sectional dimension (e.g. dimension a') at a distal end of the elongate body. In some embodiments, the second cross-sectional dimension is less than an internal diameter of the bore, while the first cross-sectional dimension is greater than the internal diameter of the bore. In some embodiments, the first cross-sectional dimension has a size ranging from about 1 mm to about 2, while the second cross-sectional dimension has a size ranging from about 0 mm to about 0.6 mm. In this way, the tapered shape of the elongate body may dictate the limit to which the probe tool may be inserted into the bore of the dispense nozzle, thereby mitigating damage to the dispense nozzle.

In some embodiments, the elongate body 141 comprises a member for picking, scraping, collecting or otherwise abrading (collectively referred to herein as "abrading means") material accumulated on the interior surface of the bore. In some embodiments, the abrading means comprises a barb, hook, or other geometric protrusion (referred to collectively herein as a "protrusion"). In some embodiments, the abrading means is located at the tip 148 of the elongate body 141. In other embodiments, the abrading means is located along the length of the elongate body 141. By way of example, a probe tool may be used to puncture accumulated reagent material enveloping the opening of the bore 161 and if that material is subsequently pushed into the bore by virtue of the movement of the probe tool 140 within the bore 161 of the dispense nozzle 160, the abrading means may be used to collect and pull the material from the interior of the bore, thereby retrieving at least a portion of it disposal.

Figure 14:
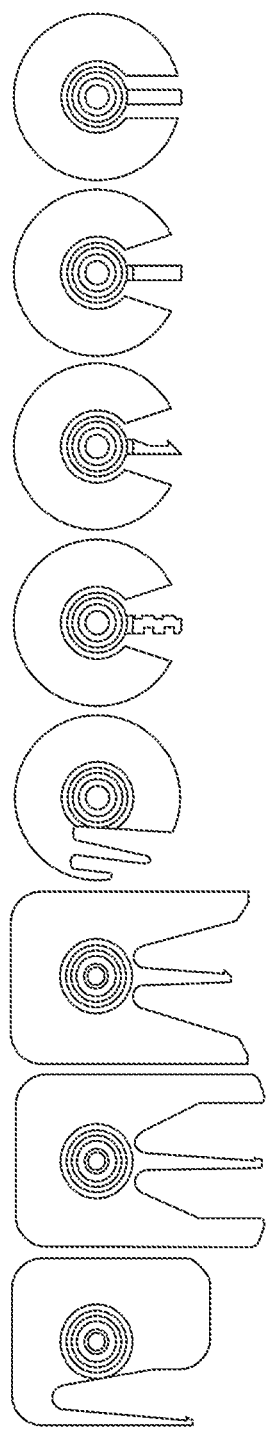
FIG. 14 provides prospective views of a nozzle caps, each nozzle cap comprising a probe tool.

In some embodiments, the tip comprises a single abrading means 170, such as depicted in FIG. 11B. In other embodiments, such as illustrated in FIG. 11C, the tip 149 comprises multiple abrading means 170, where each abrading means may lie in the same plane or in different planes. In other embodiments, one or more abrading means are positioned along the elongate body 141, and again these one or more abrading means may all be in the same plane or in different planes. In some embodiments, multiple protrusions are located along the elongate body 141 such that the elongate body 141 resembles a "key," as depicted in FIG. 14.

The nozzle cap may be fabricated from any material. For example, the nozzle cap or any constituent part thereof may be made from a plastic derived from a polymer, a copolymer, or a polymer or co-polymer blend, rubber, ceramic, glass, silicon, or metal. Non-limiting examples of plastics include, without limitation, acrylonitrile butadiene styrene (ABS), polyurethane, polyester, polypropylene, or combinations thereof. In some embodiments, the nozzle cap may be comprised of a hydrophobic material, a hydrophilic material, or any combination thereof. In some embodiments, the nozzle cap and its constituent elements are fabricated from a material that will not shed or leach material into the bore of the dispense nozzle. In other embodiments, the nozzle cap and its constituent elements are fabricated from a material that will not react with any of the reagents dispensed through the dispense nozzle. In some embodiments, the probe tool is comprised of a material that will allow for the removal of accumulated material from the bore, but yet does not scratch any interior surface within the bore 161, e.g. a material that is sufficiently rigid to remove accumulated material while not scratching any interior surface.

In some embodiments, the different constituent parts of the nozzle cap are comprised of different materials. For example, in some embodiments, the retention member 120 may be comprised of a flexible or pliable material while the base 110 and the retention member 120 are formed from more rigid materials. In some embodiments, the probe tool 140 is formed from a material that is at least partially deformable such that it may at least partially conform to the contours of any dispense nozzle inserted therein. Likewise, in some embodiments, the retention member may be formed from an elastomeric material such that it may expand upon insertion of any dispense nozzle and at least partially conform to any of the contours of the dispense nozzle inserted therein.

In some embodiments, nozzle cap or any portion thereof is produced directly by machining or milling a block of solid material. In some embodiments, the nozzle cap or any portion thereof is produced by 3D printing. In other embodiments, the nozzle cap or any portion thereof is produced from a mold. In some embodiments, the entire nozzle cap is formed from a single machined, milled, or molded piece. In other embodiments, the nozzle cap is constructed from separate constituent parts. For example, a retention member, base, and/or probe tool may be each manufactured separately and then attached or otherwise affixed together by methods known to those of ordinary skill in the art (e.g. screws, clips, adhesives, etc.). In some embodiments, the retention member 120 is integral with the base 110 and formed from a single machined, milled, or molded piece, while the probe tool 140 is attached thereto. Likewise, in other embodiments, the base 110 is integral with the probe tool 140 and formed from a single machined, milled, or molded piece, while the retention member 120 is attached thereto. The skilled artisan will be able to select an appropriate manufacturing process to yield the desired nozzle cap having the desired features.

The nozzle cap or individual portions thereof may be smooth or rough. As used herein, the term "rough" refers to surface irregularities introduced during or after fabrication of the nozzle cap or portions thereof. For example, in some embodiments the inner surface of the outer body member may comprise a surface irregularity or texture to increase its contact area with a dispense nozzle, and thus increase friction, between the inner surface of the outer body member and the outer surface of the dispense nozzle.

Similarly, the nozzle cap or any portion thereof may be treated with a coating to alter the chemical properties of a surface. For example, a coating may be applied to the inner surface of the outer body portion to increase "tackiness" such that there is an increase in the friction between the inner surface of the outer body member and the outer surface of the dispense nozzle. Any appropriate coatings may be applied to the nozzle cap or a portion thereof after the production process.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

ADDITIONAL EMBODIMENTS

Additional Embodiment 1

A fluid dispenser comprising:
a barrel defining a fluid reservoir chamber;
a dispense nozzle in communication with the fluid reservoir chamber; and
a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle.

Additional Embodiment 2

The fluid dispenser of additional embodiment 1, wherein the nozzle cap forms a fluid-tight seal with the dispense nozzle.

Additional Embodiment 3

The fluid dispenser of any of the preceding additional embodiments, wherein the nozzle cap forms an air-tight seal with the dispense nozzle.

Additional Embodiment 4

The fluid dispenser of any of the preceding additional embodiments, wherein the protuberance is configured for insertion into a bore of the dispense nozzle.

Additional Embodiment 5

The fluid dispenser of any of the preceding additional embodiments, wherein the lumen frictionally engages at least a portion of an outer surface of the dispense nozzle.

Additional Embodiment 6

The fluid dispenser of any of the preceding additional embodiments, wherein the protuberance frictionally engages at least a portion of an interior surface of the dispense nozzle.

Additional Embodiment 7

The fluid dispenser of any of the preceding additional embodiments, wherein the lumen has a tapered shape.

Additional Embodiment 8

The fluid dispenser of any of the preceding additional embodiments, wherein the nozzle cap further comprises a member for removing accumulated material from an interior surface of the dispense nozzle.

Additional Embodiment 9

The fluid dispenser of additional embodiment 8, wherein the member for removing accumulated material is a probe tool having an elongate body adapted for at least partial insertion into a bore of the dispense nozzle.

Additional Embodiment 10

The fluid dispenser of additional embodiment 9, wherein the elongate body comprises a first cross-sectional dimension that is less than an inner diameter of the bore of the dispense nozzle and a second cross-sectional dimension that is greater than the inner diameter of the bore of the dispense nozzle.

Additional Embodiment 11

The fluid dispenser of additional embodiment 9, wherein the elongate body further comprises one or more abrading means.

Additional Embodiment 12

A biological specimen processing apparatus comprising the fluid dispenser of any of additional embodiments 1 to 11.

Additional Embodiment 13

A fluid dispenser comprising:
a barrel defining a fluid reservoir chamber;
a dispense nozzle in communication with the fluid reservoir chamber; and
a nozzle cap comprising an outer cylindrical body portion configured and dimensioned to frictionally engage an outer surface of the dispense nozzle, and an inner body portion spaced from the outer body defining a protuberance, the protuberance adapted to be at least partially inserted into a bore of the dispense nozzle.

Additional Embodiment 14

The fluid dispenser of additional embodiment 13, wherein the protuberance at least partially engages an interior surface of the dispense nozzle.

Additional Embodiment 15

The fluid dispenser of any of additional embodiments 13 to 14, wherein the nozzle cap forms one of a fluid-tight seal or an air-tight seal with the dispense nozzle.

Additional Embodiment 16

The fluid dispenser of any of additional embodiments 13 to 15, wherein the lumen frictionally engages an outer surface of the dispense nozzle.

Additional Embodiment 17

The fluid dispenser of any of additional embodiments 13 to 16, wherein the lumen has a Luer fitting design.

Additional Embodiment 18

The fluid dispenser of any of additional embodiments 13 to 17, wherein the nozzle cap further comprises a member for removing accumulated material from an interior surface of the dispense nozzle.

Additional Embodiment 19

The fluid dispenser of any of additional embodiments 13 to 18, wherein the member for removing accumulated material is a probe tool having an elongate body adapted for at least partial insertion into a bore of the dispense nozzle.

Additional Embodiment 20

The fluid dispenser of any of additional embodiments 13 to 19, wherein the elongate body comprises a first cross-sectional dimension that is less than an inner diameter of the bore of the dispense nozzle and a second cross-sectional dimension that is greater than the inner diameter of the bore of the dispense nozzle.

Additional Embodiment 21

The fluid dispenser of any of additional embodiments 13 to 20 wherein the elongate body further comprises one or more abrading means.

Additional Embodiment 22

A biological specimen processing apparatus comprising the fluid dispenser of any of additional embodiments 13 to 21.

Additional Embodiment 23

A fluid dispenser comprising:
a barrel having a reservoir chamber;
a dispense nozzle in communication with the reservoir chamber; and
a nozzle cap releasably engaged to the dispense nozzle, the nozzle cap comprising a base and a retention member extending from the base, wherein the retention member has an inner surface, a first rim, and a second rim, the inner surface and the first and second rims defining a lumen that extends from the first rim to the second rim, and wherein the nozzle cap further comprises a protuberance extending into the lumen.

Additional Embodiment 24

The fluid dispenser of additional embodiment 23, wherein the retention member extends from the base and into a plane perpendicular to the base.

Additional Embodiment 25

The fluid dispenser of any of additional embodiments 23 to 24, wherein the inner surface of the retention member frictionally engages an exterior surface of the dispense nozzle.

Additional Embodiment 26

The fluid dispenser of any of additional embodiments 23 to 25, wherein the protuberance is adapted for at least partial insertion into a bore of the dispense nozzle.

Additional Embodiment 27

The fluid dispenser of any of additional embodiments 23 to 26, wherein the protuberance at least partially engages an interior surface of the dispense nozzle.

Additional Embodiment 28

The fluid dispenser of any of additional embodiments 23 to 27, wherein the nozzle cap forms one of a fluid-tight seal or an air-tight seal with the dispense nozzle.

Additional Embodiment 29

The fluid dispenser of any of additional embodiments 23 to 28, wherein the nozzle cap further comprises a device for removing accumulated material from an interior surface of the dispense nozzle.

Additional Embodiment 30

The fluid dispenser of additional embodiment 29, wherein the device for removing accumulated material is a probe tool having an elongate body adapted for at least partial insertion into a bore of the dispense nozzle.

Additional Embodiment 31

The fluid dispenser of additional embodiment 29, wherein the elongate body has a shape which tapers from a first cross-sectional dimension to a second cross-sectional dimension, wherein the second cross-sectional dimension is greater than an inner diameter of a bore of the dispense nozzle.

Additional Embodiment 32

The fluid dispenser of additional embodiment 29, wherein the elongate body further comprises one or more abrading means.

Additional Embodiment 33

A biological specimen processing apparatus comprising the fluid dispenser of any of additional embodiments 1 to 32.

Additional Embodiment 34

A fluid dispenser comprising:
a barrel defining a fluid reservoir chamber;
a dispense nozzle in communication with the fluid reservoir chamber; and
a nozzle cap including a retention member to releasably secure the nozzle cap to a distal end of the dispense nozzle, the retention member including a Luer fitting design adapted to engage an outer surface of the dispense nozzle, the retention member further comprising a protuberance adapted to be at least partially inserted into a bore of the dispense nozzle.

Additional Embodiment 35

A biological specimen processing apparatus comprising the fluid dispenser of any of additional embodiments 1 to 34.

Additional Embodiment 36

A nozzle cap comprising a base and a probe tool adapted for insertion into a bore of a dispense nozzle, wherein at least a portion of the probe tool comprises a cross-sectional dimension that is less than an inner diameter of the bore of the dispense nozzle.

Additional Embodiment 37

The nozzle cap of additional embodiment 36, wherein the probe tool is integral with a first edge of the base.

Additional Embodiment 38

The nozzle cap of any of additional embodiments 36 to 37, wherein the probe tool has a length which does not extend past a line continuous with a second edge of the base.

Additional Embodiment 39

The nozzle cap of any of additional embodiments 36 to 38, wherein the probe tool is located within a cutaway in the base.

Additional Embodiment 40

The nozzle cap of additional embodiment 39, wherein the probe tool has a length which does not extend past the bisection of a line running through a center of the probe tool and a line continuous with an edge proximate the distal end of the probe tool.

Additional Embodiment 41

The nozzle cap of any of additional embodiments 36 to 38, wherein the base is substantially circular.

Additional Embodiment 42

The nozzle cap of additional embodiment 41, wherein the probe tool has a length which does not extend past the bisection of a line running through a center of the probe tool and an arc continuous with a circumferential edge of the substantially circular base.

Additional Embodiment 43

The nozzle cap of any of additional embodiments 36 to 39, wherein the probe tool comprises an elongate body having a tapered shape.

Additional Embodiment 44

The nozzle cap of any of additional embodiments 36 to 398 and 43, wherein the probe tool comprises one or more abrading means.

Additional Embodiment 45

The nozzle cap of any of additional embodiments 36 to 39, further comprising a device for releasably engaging a distal end of a dispense nozzle.

Additional Embodiment 46

The nozzle cap of additional embodiment 45, wherein the device for releasably engaging the distal end of the dispense nozzle comprises an inner surface, a first rim, and a second rim, the inner surface and the first and second rims defining a lumen that extends from the first rim to the second rim, and wherein the nozzle cap further comprises a protuberance extending into the lumen.

Additional Embodiment 47

The nozzle cap of additional embodiment 45, wherein the device for releasably engaging the distal end of the dispense nozzle comprises an outer cylindrical body portion configured and dimensioned to frictionally engage an outer surface of the dispense nozzle, and an inner body portion spaced from the outer body defining a protuberance, the protuberance adapted to be at least partially inserted into a bore of the dispense nozzle.

Additional Embodiment 48

The fluid dispenser of additional embodiment 47, wherein the protuberance at least partially contacts an interior surface of the dispense nozzle.

Additional Embodiment 49

A nozzle cap comprising:
a base and a retention member extending from the base;
wherein the retention member has an inner surface, a first rim, and a second rim, the inner surface and first and second rims defining a lumen, the lumen extending from the first rim to the second rim, and wherein the nozzle cap further comprises a protuberance extending into the lumen;
wherein the base further comprises a probe tool adapted for insertion into a bore of a dispense nozzle, wherein the probe tool comprises at least one abrading means.

Additional Embodiment 50

The nozzle cap of additional embodiment 49, wherein the probe tool has a shape which tapers from a first cross-sectional dimension to a second cross-sectional dimension, wherein the second cross-sectional dimension is greater than an inner diameter of the bore of the dispense nozzle.

Additional Embodiment 51

The nozzle cap of any of additional embodiments 49 to 50, wherein the at least one abrading means are positioned at a tip of the probe tool.

Additional Embodiment 52

The nozzle cap of any of additional embodiments 49 to 51, wherein the probe tool comprises an elongate member, and wherein the at least one abrading means are located along the length of the elongate member.

Additional Embodiment 53

The nozzle cap of any of additional embodiments 49 to 52, wherein a length of the probe tool extends beyond an outer edge of the base.

Additional Embodiment 54

The nozzle cap of any of additional embodiments 49 to 53, wherein the retention member is adapted to releasably engage the dispense member.

Additional Embodiment 55

A nozzle cap comprising
a base and a body,
  the body comprising
    an outer cylindrical portion, and
    an inner portion spaced from the outer cylindrical portion and defining a protuberance,
  the base comprising a probe tool comprising
    a handle, and
    an elongate member,
      the elongate member having a shape which tapers distally from a first cross-sectional dimension to a second cross-sectional dimension.

Additional Embodiment 56

The nozzle cap of additional embodiment 55, wherein the elongate member comprises at least one abrading means.

Additional Embodiment 57

The nozzle cap of any of additional embodiments 55 to 56, wherein the abrading means is a bark, hook, or shoulder at the tip of the elongate member.

Additional Embodiment 58

The nozzle cap of any of additional embodiments 55 to 57, wherein the probe tool is in the same plane as the base.

Additional Embodiment 59

A kit comprising:
a fluid dispenser comprising a barrel having a reservoir chamber, a valve and a piston, the reservoir chamber containing fluid, the valve at a lower portion of the reservoir chamber, the piston having a bottom portion and at least one side portion, the piston having at least one hole on the side portion; and a coupler, the coupler having a dispense chamber, the piston moveable inside the coupler wherein the piston is moveable from a first position to a second position, and further comprising a seal associated with the at least one piston side portion, the seal abutting the at least one hole on the side portion in the first position; and
the nozzle cap of any of additional embodiments 36 to 58.

Additional Embodiment 60

A kit comprising:
a fluid dispenser comprising a barrel having a piston, the piston having a bottom portion and at least one side portion, the piston having at least on hole on the side portion and having no hole in the bottom portion, the piston moveable from a first position to a second position; a seal; and a coupler, the coupler having a dispense chamber, the piston moving inside the coupler, wherein the seal abuts the at least one hole in the first position and wherein the seal does not about the at least one hole in the second position.
the nozzle cap of any of additional embodiments 36 to 58.

Additional Embodiment 61

A probe tool assembly for insertion into a bore of a dispense nozzle comprising a handle and an elongate member, the elongate member having a first cross-sectional dimension which is greater than an inner diameter of the bore, and wherein the elongate member has a shape which tapers distally from the first cross-sectional dimension to a second cross-sectional dimension, wherein at least the second cross-section dimension is sized to fit within the bore.

Additional Embodiment 62

A fluid dispenser comprising:
a barrel having a reservoir chamber;
a dispense nozzle in communication with the reservoir chamber;
wherein the fluid dispenser comprises a device for preventing or mitigating the accumulation or aggregation of reagent and/or fluid at the tip of the dispense nozzle.

Additional Embodiment 63

The fluid dispenser of additional embodiment 62, wherein the fluid dispenser is configured such that an amount of reagent or fluid drawback into the dispense nozzle or reservoir chamber is greater than a volume of a droplet formed at the tip of the dispense nozzle.

Additional Embodiment 64

The fluid dispenser of any of additional embodiments 62 to 63, further comprising a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle.

Additional Embodiment 65

The fluid dispenser of any of additional embodiments 62 to 63, further comprising a nozzle cap, the nozzle cap comprising a base and a body, the body comprising an outer cylindrical portion, and an inner portion spaced from the outer cylindrical portion and defining a protuberance, the base comprising a probe tool comprising a handle, and an elongate member, the elongate member having a shape which tapers distally from a first cross-sectional dimension to a second cross-sectional dimension.

Additional Embodiment 66

A biological specimen processing apparatus comprising the fluid dispenser of any of additional embodiments 62 to 64.

Additional Embodiment 67

A fluid dispenser comprising:
a barrel defining a fluid reservoir chamber;
a dispense nozzle in communication with the fluid reservoir chamber; and
a nozzle cap comprising a body having an opening disposed at a first end and a closed second end, the opening disposed at the first end and the closed second end defining a lumen.

Additional Embodiment 68

The fluid dispenser of additional embodiment 67, wherein the nozzle cap further comprises a protuberance disposed within the lumen and extending from the closed second end toward the opening.

Additional Embodiment 69

The fluid dispenser of any of additional embodiments 67 and 68, wherein at least one of the lumen and the protuberance are configured to frictionally engage a surface of the dispense nozzle.

Additional Embodiment 70

A fluid dispenser comprising: a barrel having a reservoir chamber; a dispense nozzle in communication with the reservoir chamber; and a nozzle cap comprising a body having an opening disposed at a first end and a closed second end, the opening disposed at the first end and the closed second end defining a lumen, the nozzle cap further comprising a protuberance disposed within the lumen and extending from the closed second end toward the opening, wherein at least one of the lumen and the protuberance are configured to frictionally engage a surface of the dispense nozzle.

The invention claimed is:

1. A biological specimen processing apparatus comprising:
a fluid dispenser comprising (i) a barrel defining a fluid reservoir chamber; and (ii) a nozzle at a first end of the barrel, wherein the nozzle comprises (a) an outer surface, and (b) a bore in fluidic communication with the fluid reservoir chamber; and
a nozzle cap comprising a body having an opening disposed at a first end and a closed second end, wherein the opening disposed at the first end and the closed second end together define a lumen, the nozzle cap further comprising a protuberance disposed within the lumen and extending from the closed second end toward the opening, and wherein at least a portion of an inner surface of the lumen is configured to frictionally engage at least a portion of the outer surface of the nozzle, wherein the nozzle cap further comprises a probe tool having an elongate body adapted for at least partial insertion into the bore of the nozzle, wherein the elongate body comprises a first cross-sectional dimension that is less than an inner diameter of the bore of the nozzle.

2. The biological specimen processing apparatus of claim 1, wherein the nozzle cap comprises a Luer fitting adapted to form one of a fluid-tight seal or an air-tight seal with the nozzle.

3. The biological specimen processing apparatus of claim 1, wherein the protuberance is configured for insertion into the bore of the nozzle.

4. The biological specimen processing apparatus of claim 1, wherein the protuberance frictionally engages at least a portion of a surface of the bore of the nozzle.

5. The biological specimen processing apparatus of claim 1, wherein the lumen has a tapered shape.

6. The biological specimen processing apparatus of claim 1, wherein the protuberance is integral with the nozzle cap.

7. The biological specimen processing apparatus of claim 6, wherein the protuberance is comprised of the same material as the body of the nozzle cap.

8. The biological specimen processing apparatus of claim 1, wherein the protuberance tapers from a first cross-sectional dimension to a second cross-sectional dimension.

9. The biological specimen processing apparatus of claim 1, wherein the elongate body of the probe tool further comprises one or more abrading members, wherein at least one of the one or more abrading members are positioned at a tip of the elongate body.

10. The biological specimen processing apparatus of claim 1, wherein the probe tool is integral with the body of the nozzle cap.

* * * * *